(12) United States Patent
Abdellatif et al.

(10) Patent No.: US 12,418,450 B2
(45) Date of Patent: Sep. 16, 2025

(54) SYSTEM AND METHOD FOR REAL-TIME ULTRABROADBAND WIRELESS COMMUNICATIONS

(71) Applicants: Northeastern University, Boston, MA (US); The Florida International University Board of Trustees, Miami, FL (US)

(72) Inventors: Hussam Abdellatif, Boston, MA (US); Paboda Viduneth Ariyarathna Beruwawela Pathiranage, San Diego, CA (US); Habarakada Liyanachchi Prabath Arjuna Madanayake, West Miami, FL (US); Josep Miquel Jornet, Needham, MA (US)

(73) Assignees: Northeastern University, Boston, MA (US); The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/412,451

(22) Filed: Jan. 12, 2024

(65) Prior Publication Data

US 2024/0163155 A1   May 16, 2024

Related U.S. Application Data

(63) Continuation-in-part of application No. 18/356,213, filed on Jul. 20, 2023, now abandoned.
(Continued)

(51) Int. Cl.
*H04L 27/36* (2006.01)

(52) U.S. Cl.
CPC .................................. *H04L 27/36* (2013.01)

(58) Field of Classification Search
CPC ....... H04L 27/36; H04L 27/362; H04L 27/364; H04L 27/366; H04L 27/361
See application file for complete search history.

(56) References Cited

U.S. PATENT DOCUMENTS

| | | | |
|---|---|---|---|
| 2003/0107446 A1* | 6/2003 | Hecht | H04L 5/00 332/103 |
| 2023/0224193 A1* | 7/2023 | Wang | H04B 1/0475 375/262 |

FOREIGN PATENT DOCUMENTS

CN          111459137 A  *  7/2020

OTHER PUBLICATIONS

Sen et al., A versatile experimental testbed for ultrabroadband communication networks above 100 GHz, available online Apr. 10, 2021 (Year: 2021).*

(Continued)

*Primary Examiner* — Freshteh N Aghdam
(74) *Attorney, Agent, or Firm* — Hamilton, Brook, Smith & Reynolds, P.C.

(57) ABSTRACT

A system and corresponding method may be employed for real-time ultrabroadband wireless communications. The system comprised a plurality of in-phase and quadrature (IQ) mixers that produce, in real-time on a per-channel basis, sub-channel signals from respective analog baseband IQ signals representing respective portions of user data. The system further comprises a power combiner. The power combiner produces a multi-channel output signal by frequency multiplexing, in real-time, the sub-channel signals produced. The multi-channel output signal represents the user data in its entirety and may be a real-time, multi-GHz wireless signal.

24 Claims, 26 Drawing Sheets
(1 of 26 Drawing Sheet(s) Filed in Color)

Related U.S. Application Data

(60) Provisional application No. 63/508,299, filed on Jun. 15, 2023, provisional application No. 63/368,941, filed on Jul. 20, 2022.

(56) References Cited

OTHER PUBLICATIONS

Abu-Surra, W., et al., "End-to-end 140 GHz Wireless Link Demonstration with Fully-Digital Beamformed System," in 2021 IEEE International Conference on Communications Workshops (ICC Workshops), 2021, pp. 1-6.
Akyildiz, et al., "Teranets: Ultra-Broadband Communication Networks in the Terahertz Band," IEEE Wireless Communications, pp. 130-135, Aug. 2014.
Akyildiz, et al., "Terahertz Band Communication: an Old Problem Revisited and Research Directions for the Next Decade," IEEE Transactions on Communications, vol. 70, No. 6, pp. 4250-4285, Jun. 2022.
Ariyarathna, et al., "Real-Time Digital Baseband System for Ultra-Broadband THz Communication," in 2020 45th International Conference on Infrared, Millimeter, and Terahertz Waves (IRMMW-THz), 2020, pp. 1-2.
Bonati, M., et al., "Open, Programmable, and Virtualized 5G Networks: State-of-the-Art and the Road Ahead," Computer Networks, vol. 182, pp. 1-28, 2020.
Callender, A., et al., "A Fully Integrated 160-GB/s D-Band Transmitter Achieving 1.1-pJ/b Efficiency in 22-nm FinFET," IEEE Journal of Solid-State Circuits, vol. 57, No. 12, pp. 3582-3598, Dec. 2022.
Chen, S., et al., "All-Electronic 100-GHz Bandwidth Digital-to-Analog Converter Generating PAM Signals up to 190 GBaud," J. Lightwave Technol., vol. 35, No. 3, pp. 411-417, Feb. 1, 2017.
Dickson, Z., et al., "A 72-GS/s, 8-Bit DAC-Based Wireline Transmitter in 4-nm FinFET CMOS for 200+ GB/s Serial Links," IEEE Journal of Solid-State Circuits, vol. 58, No. 4, pp. 1074-1086, Apr. 2023.
Doré, Y., et al., "Above-90GHz Spectrum and Single-Carrier Waveform as Enablers for Efficient Tbit/s Wireless Communications," in IEEE 2018, pp. 274-278.
Eckhardt, T., et al., "Measurements in a Real Data Centre at 300 GHz and Recent Results," in 13th European Conference on Antennas and Propagation (EuCAP), 2019, pp. 1-5.
Fosberry and M. Livadaru, "Digital Synthetic Receive Beamforming with the Xilinx ZC1275 Evaluation Board," in IEEE International Symposium on Phased Array System Technology (PAST), 2019, pp. 1-2.
Hitech Global, HTG-ZRF8: Xilinx ultrascale RFSoC development platform, Sep. 12, 2019, Downloaded on Jun. 26, 2024 from https://web.archive.org/web/20190912002840/http://www.hitechglobal.com:80/Boards/Zynq_RFSoc.htm.
IEEE, "Standard for High Data Rate Wireless Multi-Media Networks—Amendment 2: 100 GB/s;" wireless switched point-to-point physical layer, IEEE Std 802.15.3d-2017, pp. 1-55, 201.
IEEE, "Standard for Wireless Multi-Media Networks;" wireless switched point-to-point physical layer, IEEE Std 802.15.3tm-2023, pp. 1-55, 201.
Jastrow, et al., "Wireless digital data transmission at 300 GHz," Electronics Letters, vol. 46, No. 9, Apr. 29, 2010.
Kanhere, H., et al., "A Power Efficiency Metric for Comparing Energy Consumption in Future Wireless Networks in the Millimeter-Wave and Terahertz Bands," IEEE Wireless Communications, pp. 56-63, Dec. 2022.
Keysight Technologies. Data Sheet, M8199A Arbitrary Waveform Generator. Version 1.2, Mar. 8, 2024, Downloaded on Jul. 31, 2024 from https://www.keysight.com/us/en/assets/3120-1465/data-sheets/M8199A-128-256-GSa-s-Arbitrary-Waveform-Generator.pdf.
National Instruments, "Introduction to the NI mmWave Transceiver System Hardware," White Paper, Jan. 17, 2019, Downloaded on Jun. 25, 2024 from https://spectrum.ieee.org/introduction-to-the-ni-mmwave-transceiver-system-hardware.
Petrov, T. Kurner, and I. Hosako, "IEEE 802.15.3d: First Standardization Efforts for Sub-Terahertz Band Communications toward 6G," IEEE Communications Magazine, pp. 28-33, Nov. 2020.
Rappaport, et al., "Wireless Communications and Applications Above 100 GHz: Opportunities and Challenges for 6G and Beyond," IEEE Access, vol. 7, pp. 78729-78757, 2019.
Sarieddeen, M.-S. Alouini, and T. Y. Al-Naffouri, "An Overview of Signal Processing Techniques for Terahertz Communications," Proceedings of the IEEE, vol. 109, No. 10, pp. 1628-1665, Oct. 2021.
Sen, V., et al., "A versatile experimental testbed for ultrabroadband communication networks above 100 GHZ," Computer Networks, vol. 193, p. 108092, 2021.
Sen and J. M. Jornet, "Experimental Demonstration of Ultrabroadband Wireless Communications at True Terahertz Frequencies," in 2019 IEEE 20th International Workshop on Signal Processing Advances in Wireless Communications (SPAWC), 2019, pp. 1-5.
Sen, V., et al., "Experimental Wireless Testbed for Ultrabroadband Terahertz Networks," in Workshop on Wireless Network Testbeds, Experimental evaluation & Characterization (WINTECH '20), Sep. 21, 2020, London, United Kingdom; Assoc. for Comp. Machinery New York, NY, USA, 2020, p. 48-55.
Sengupta, T., et al., "Terahertz integrated electronic and hybrid electronic-photonic systems," Nat. Electron., vol. 1, pp. 622-635, Dec. 2018.
Xing and T. S. Rappaport, "Propagation Measurement System and Approach at 140 GHZ-Moving to 6G and above 100 GHz," in IEEE Global Communications Conference (GLOBECOM), 2018, pp. 1-6.
Wang, H., et al., "A 128 gbps pam-4 feed forward equalizer with optimized 1ui pulse generator in 65nm cmos," IET Circuits Devices Syst. 2023; 17:174-179.
Yonar, P., et al., "An 8-bit 56GS/s 64x Time-Interleaved ADC with Bootstrapped Sampler and Class-AB Buffer in 4nm CMOS," in 2022 IEEE Symposium on VLSI Technology and Circuits (VLSI Technology and Circuits). IEEE, 2022, pp. 168-169.
Zhao, et al., M-Cube: A Millimeter-Wave Massive MIMO Software Radio. In The 26th Annual International Conference on Mobile Computing and Networking (MobiCom '20), Sep. 21-25, 2020, London, UK; Association for Computing Machinery, New York, NY, 2020.
Zhu, T., et al., "A 38-GS/s 7-bit Pipelined-SAR ADC with Speed-Enhanced Bootstrapped Switch and Output Level Shifting Technique in 22-nm FinFET," IEEE Journal of Solid-State Circuits, vol. 58, No. 8, Aug. 2023.
Infiniium UXR-series oscilloscopes, Keysight Technologies, 2018-2024, Published in USA Jul. 25, 2024, Downloaded on Jul. 31, 2024 from https://www.keysight.com/us/en/assets/7018-06242/data-sheets/5992-3132.pdf.
RfsoC, "Introducing the RFSoC Product Family," AMD Xilinx RFSoC, Downloaded on Jul. 30, 2024 from https://www.avnet.com/wps/portal/us/products/product-highlights/xilinx-rfsoc/.

* cited by examiner

| TEAM 158 | TECHNOLOGY 151 | FREQUENCY [GHz] 152 | ANTENNA GAIN (TX:RX [dBi]) 153 | NUMBER OF CHANNELS 154 | BANDWIDTH [GHz] 155 | THEORETICAL MAX BIT-RATE [Gbps] 156 | DEMONSTRATED DATA-RATE [Gbps] 157 |
|---|---|---|---|---|---|---|---|
| KEYSIGHT 159 | (OFFLINE) AWG/DSO | 144 | N/A | 1 | 10 | 61.6 | N/A |
| SAMSUNG 160 | (REAL-TIME) RFSoC + ANTENNA ARRAY | 135 | 20:20 | 1 | 2 | 32 | 6.39 |
| UNLAB 161 | (OFFLINE) AWG/DSO + VDI SINGLE HORN ANTENNA | 130 | 32:32 | 1 | 20 | 80 | 40 |
| NATIONAL INSTRUMENTS 162 | (REAL-TIME) mmWave TRANSCEIVER SYSTEM (FPGA-BASED) + ARBITRARY | 140 | N/A | 1 | 2 | 12 | 7.3 |
| UNLAB (THIS WORK) 163 | (REAL-TIME) RFSoC + VDI SINGLE HORN ANTENNA | 135 | 32:32 | 4 | 2 | 50 | 16 |

FIG. 1D

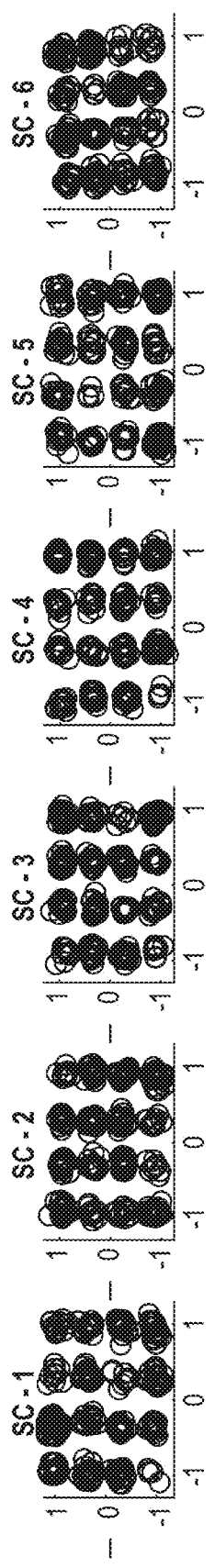
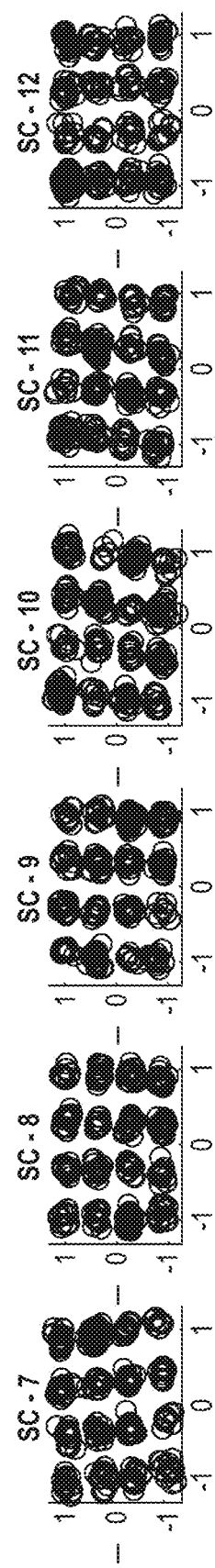
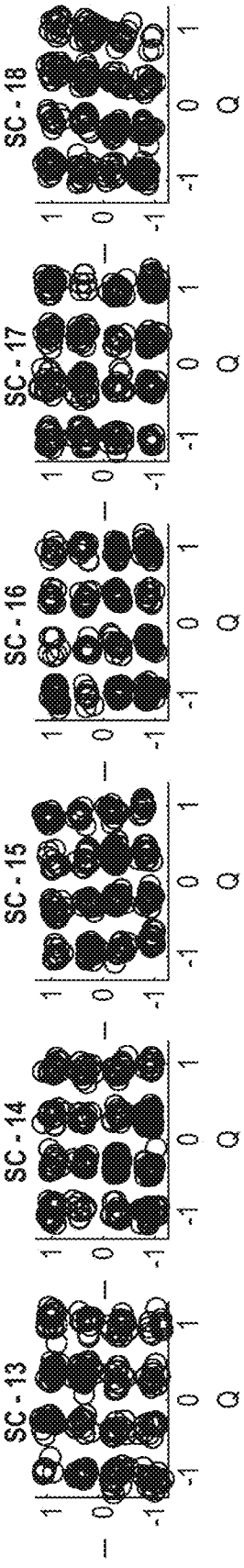
FIG. 7-1 — FIG. 7-18

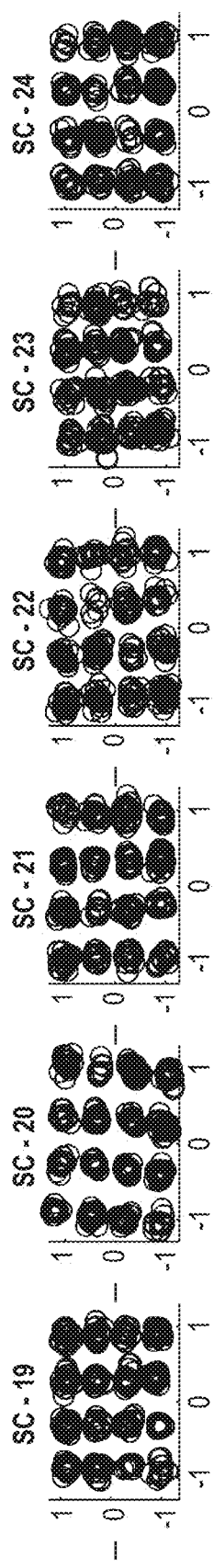
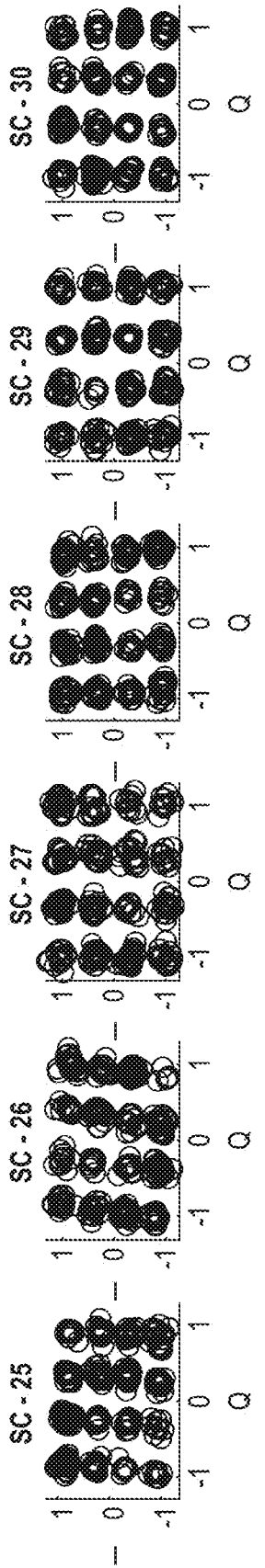
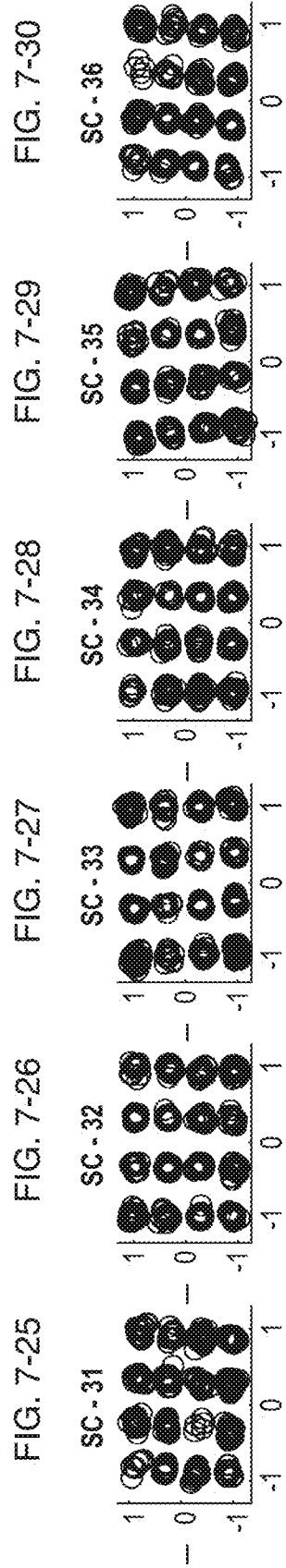

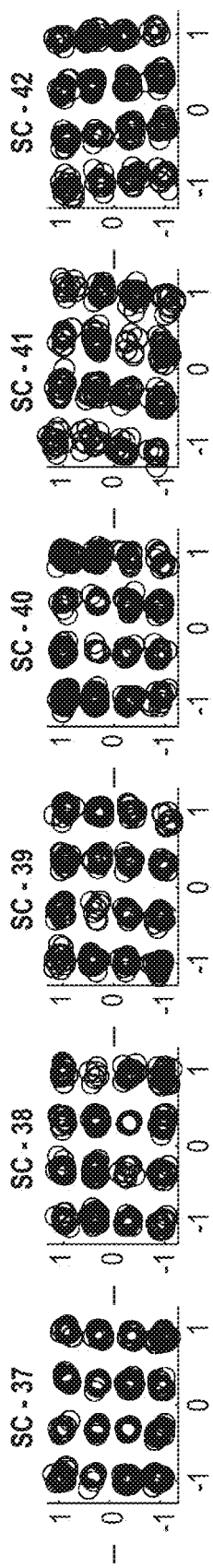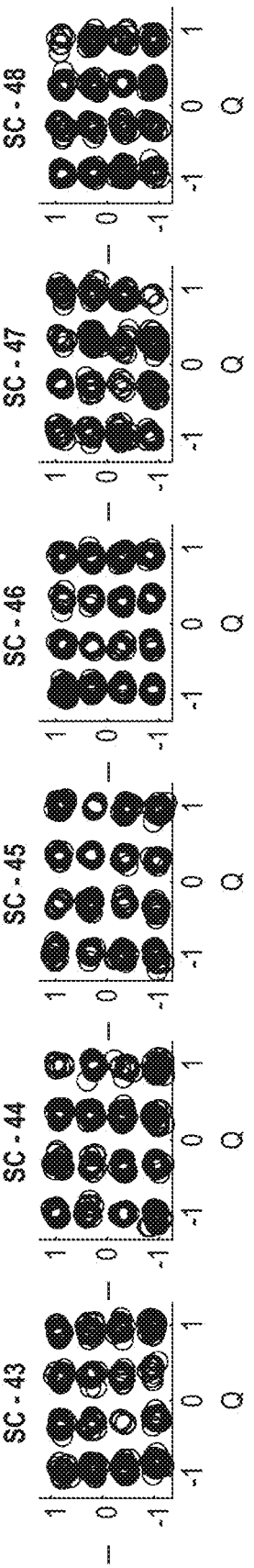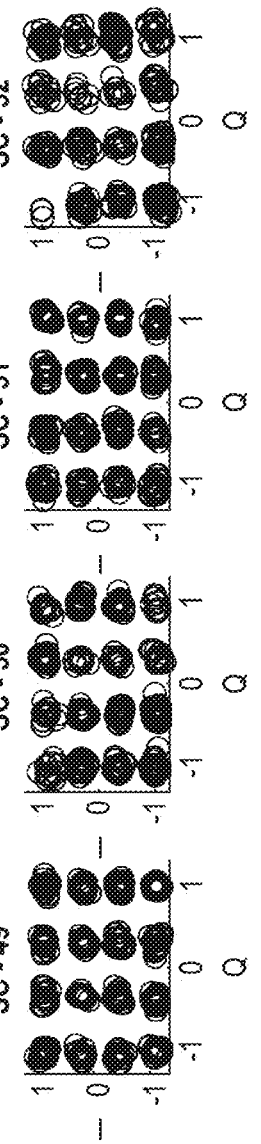
FIG. 7-37, FIG. 7-38, FIG. 7-39, FIG. 7-40, FIG. 7-41, FIG. 7-42, FIG. 7-43, FIG. 7-44, FIG. 7-45, FIG. 7-46, FIG. 7-47, FIG. 7-48, FIG. 7-49, FIG. 7-50, FIG. 7-51, FIG. 7-52

SYSTEM AND METHOD FOR REAL-TIME ULTRABROADBAND WIRELESS COMMUNICATIONS

RELATED APPLICATIONS

This application is a continuation-in-part of U.S. application Ser. No. 18/356,213, filed on Jul. 20, 2023 which claims the benefit of U.S. Provisional Application No. 63/368,941, filed on Jul. 20, 2022, and U.S. Provisional Application No. 63/508,299, filed on Jun. 15, 2023. The entire teachings of the above applications are incorporated herein by reference.

GOVERNMENT SUPPORT

This invention was made with government support under FA8750-20-1-0200 from the Air Force Research Laboratories and 2034632 from the National Science Foundation. The government has certain rights in the invention.

BACKGROUND

Sixth generation (6G) wireless technology is the successor to fifth generation (5G) wireless technology. 6G networks will be able to use higher frequencies than 5G networks and provide substantially higher capacity and much lower latency. One of the goals of 6G is to support one microsecond latency communications.

SUMMARY

According to an example embodiment, a system for real-time wireless communications comprises a plurality of in-phase and quadrature (IQ) mixers configured to produce in real-time on a per-channel basis, sub-channel signals from respective analog baseband IQ signals representing respective portions of user data. The system further comprises a power combiner configured to produce a multi-channel output signal by frequency multiplexing, in real-time, the sub-channel signals produced. The amplified multi-channel output signal represents the user data in its entirety.

The system may further comprise an output amplifier coupled to the power combiner. The output amplifier may be configured to produce, in real-time, an amplified multi-channel output signal by amplifying the multi-channel signal produced by the power combiner. The output amplifier may be further configured to cover a frequency range of the sub-channel signals produced.

The system may further comprise sub-channel amplifiers configured to amplify in parallel, in real-time on the per-channel basis, the sub-channel signals produced.

The system may further comprise filters coupled to respective IQ mixers of the plurality of IQ mixers. The filters may be configured to filter in parallel, in real-time on the per-channel basis, the sub-channel signals produced.

The filters may be post-mixer filters. The system may further comprise a plurality of digital-to-analog converter (DAC) pairs and a plurality of pre-mixer filter pairs. A sub-channel of a plurality of channels of the system may include a respective DAC pair of the plurality of DAC pairs, a respective pre-mixer filter pair of the plurality of pre-mixer filter pairs, a respective IQ mixer of the plurality of IQ mixers, and a respective post-mixer filter interposed between the respective IQ mixer and the power combiner.

The respective DAC pair may be configured to produce a respective I stream and a respective Q stream from a respective digital packetized portion of the user data. The respective pre-mixer filter pair may be configured to filter the respective I stream and respective Q stream produced. The respective IQ mixer may be configured to produce a respective sub-channel signal of the sub-channel signals based on the respective I stream and respective Q stream produced and filtered. The multi-channel output signal produced may include the respective sub-channel signal produced.

The system may be coupled to a radio frequency (RF) front-end. The system may be configured to output, via the RF front-end, the multi-channel output signal produced.

The plurality of IQ mixers may be a plurality of transmit stage IQ mixers. The filters may be transmit stage filters. The output amplifier may be a transmit stage amplifier. The system may further comprise a power splitter configured to split an input signal, received via the RF front-end, into a plurality of copies of the input signal. A total number of the plurality of copies may be based on a total number of channels of the system. A plurality of receive stage IQ mixers may be coupled to the power splitter. Receive stage IQ mixers of the plurality of receive stage IQ mixers may be configured to produce, in real-time, a respective I stream signal and respective Q stream signal, in parallel on a per-channel basis, based on a respective copy of the input signal of the plurality of copies of the input signal. The system may further comprise a plurality of receive stage filters coupled to respective receive stage IQ mixers of the plurality of receive stage IQ mixers. Receive stage filters of the plurality of receive stage filters may be configured to filter in parallel, in real-time on the per-channel basis, the respective I stream and respective Q stream signals produced. The system may further comprise a plurality of receive stage amplifiers coupled to respective receive stage filters of the plurality of receive stage filters. Receive stage filters of the plurality of receive stage filters may be configured to amplify in parallel, in real-time on the per-channel basis, the respective I stream and respective Q stream signals produced and filtered.

The system may further comprise a plurality of analog-to-digital converters (ADCs). ADCs of the plurality of ADCs may be configured to produce in parallel, in real-time, a plurality of digital data streams by converting in parallel, in real-time on the per channel basis, the respective I stream and respective Q stream signals produced, filtered, and amplified, from an analog domain to a digital domain.

The system may be configured to operate in a terahertz (THz) frequency band and utilize a target bandwidth in real-time.

The multi-channel output signal produced may be a real-time, ultra-broadband THz wireless signal. The real-time, ultra-broadband THz wireless signal may be a real-time, multi-GHz wireless signal.

The system may be implemented via an integrated circuit (IC) for non-limiting example. The IC may include analog, digital, mixed signal and photonic integrated circuits (ICs) for non-limiting examples.

The system may further comprise a plurality of data converters. The user data may be processed through a digital system on a RF system-on-chip (RFSoC) in a polyphase architecture to match a sampling rate of the data converters of the plurality of data converters.

According to another example embodiment, a method for real-time wireless communications comprises producing in parallel, in real-time on a per channel basis, sub-channel signals from respective analog baseband in-phase and quadrature (IQ) signals representing respective portions of user data. The method further comprises producing a multi-channel output signal by multiplexing, in real-time, the sub-channel signals produced. The method further comprises producing, in real-time, an amplified multi-channel output signal by amplifying the multi-channel signal produced. The amplified multi-channel output signal represents the user data in its entirety.

Alternative method embodiments parallel those described above in connection with the example system embodiment.

It should be understood that example embodiments disclosed herein can be implemented in the form of a method, apparatus, system, or computer readable medium with program codes embodied thereon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1B-2 is a block diagram of an example embodiment of the system of FIG. 1B-1.

FIG. 1B-3 is a block diagram of another example embodiment of the system of FIG. 1B-1.

FIG. 1D is a table that provides a comparison of state-of-the-art communication terahertz (THz) testbeds.

FIGS. 7-1 through 7-52 are plots of example embodiments of channel-1 16-quadrature amplitude modulation (QAM) constellations for each data sub-carrier.

FIG. 11 is a block diagram of an example internal structure of a computer optionally within an embodiment disclosed herein.

DETAILED DESCRIPTION

Figure 1A:
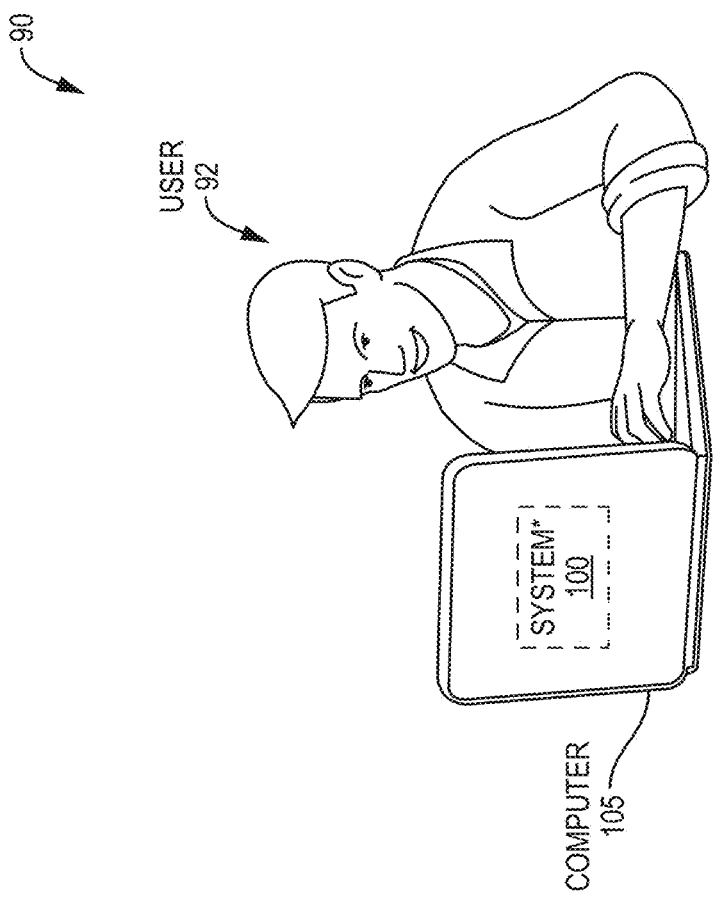
FIG. 1A is a block diagram of an example embodiment of a computer-based device with an example embodiment of a system implemented thereon.

A description of example embodiments follows.

In signal processing, baseband is a range of frequencies occupied by a signal that has not been modulated to higher frequencies. As such, a baseband signal (or lowpass signal) disclosed herein is a signal that has non-zero magnitude at frequencies at or near zero frequency.

Wireless communication in the terahertz band (100 GHz to 10 THz) is envisioned as a useful building block of 6G wireless systems, due to the abundant channel bandwidth available above 100 GHz. Thanks to the narrowing of the so-called terahertz technology gap, several platforms for experimental terahertz communication research have been developed. However, these are mostly channel-sounding or technology demonstrator test-beds that do not contain a re-configurable physical layer unit to accomplish real-time communication. Those systems are very popular when it comes to conducting channel and physical layer experiments, which is why sub-THz research is focused on channel studies and physical layer design. However, the upper networking layers have been mainly studied in simulations that do not necessarily capture this frequency band's hardware impairments and peculiarities. An example embodiment of a real-time wireless communications system disclosed herein demonstrates a communication link of 16 Gbps by utilizing an example embodiment of custom-built, fully reconfigurable software-defined radio (SDR) at 135 GHz with over 8 GHz of bandwidth for non-limiting example. It should be understood that an example embodiment disclosed herein is not limited thereto and could, for non-limiting example, operate under 100 GHz. An example embodiment of a full design approach is disclosed further below, alongside some of the challenges foreseen when implementing radios at these high frequencies.

I. INTRODUCTION

The spectrum up to 100 GHz is mostly allocated to different active services and passive uses and, thus, has become congested and fully utilized. Alongside the rapidly growing demands for increased data rates imposed by recent advancements in technologies, such as virtual reality and augmented reality (VR/AR) and autonomous driving, the mmWave band and below has become more or less spoken for in terms of frequency allocation. Therefore, the massive demand and growth in the wireless sector drives moving to higher carrier frequencies beyond 100 GHz due to the underlying basic requirement for more capacity. Capacity is mainly enabled by bandwidth and enhanced with signal processing techniques, such as but not limited to higher order modulation and multiple-input multiple-output (MIMO) techniques. Nonetheless, there comes a capacity limitation when the bandwidth is capped, which is not the case in the 100 GHz to 1 THz band.

The radio spectrum beyond 100 GHz is still uncharted for wireless communication and carries abundant spectrum having dozens of contiguous bandwidths for future needs (I. F. Akyildiz, C. Han, Z. Hu, S. Nie, and J. M. Jornet, "Terahertz band communication: An old problem revisited and research directions for the next decade," IEEE Transactions on Communications, vol. 70, no. 6, pp. 4250-4285, 2022, T. S. Rappaport, Y. Xing, O. Kanhere, S. Ju, A. Madanayake, S. Man-dal, A. Alkhateeb, and G. C. Trichopoulos, "Wireless communications and applications above 100 GHz: Opportunities and challenges for 6 g and beyond," IEEE Access, vol. 7, pp. 78 729-78 757, 2019). Especially, the sub-THz to THz band (100 GHz-10 THz) has become very attractive to the wireless communication community as it already possesses a large bandwidth and has advantageous propagation characteristics when compared to optical frequency bands. To wit, free-space optical links are more prone to be blocked by obstructions and transmit/receive optics are even more difficult to align, especially when motion is present. The use of wide bandwidths at carrier frequencies beyond 100 GHz is further motivated by the fact that, at higher frequencies, the use of simple modulation techniques, such as M-nary PSK, over a wide bandwidth, is more energy efficient compared to higher order modulation techniques, such as orthogonal frequency division multiplexing (OFDM), which are spectrally efficient but not energy efficient from a total system energy consumption standpoint. For example, in (O. Kanhere, H. Poddar, Y. Xing, D. Shakya, S. Ju, and T. S. Rappaport, "A power efficiency metric for comparing energy consumption in future wireless networks in the millimeter-wave and terahertz bands," IEEE Wireless Communications, vol. 29, no. 6, pp. 56-63, 2022), the energy waste factor was computed for both a 28 GHz link using 400 MHz of bandwidth, and a 140 GHz link using various bandwidths; it was shown that energy efficiency was much improved over the reference 28 GHz case when the baseband bandwidth of the 140 GHz link was above 3.5 GHz. Nonetheless, when it comes to implementing base-band modules supporting multi-GHz of bandwidth, it is still unclear what is the most practical methodology given the high sampling rates and low clock speeds required. With that being said, an example embodiment disclosed herein may be OFDM-based to allow for a more suitable implementation given its ease of parallelism regarding signal processing.

Although there has been significant advancement toward improving the electronics to support such high frequencies and, thus, closing the THz gap, it is still unclear how to develop such digital signal processing (DSP) methods to handle huge bandwidths that are being pursued by moving to sub-THz and THz band. According to the Nyquist sampling theorem, the digital processing of the signals has to happen at a frequency fs that is greater than twice the information-bearing bandwidth B of the signal. The typical B values for the envisioned THz systems is expected to be tens to hundreds of GHz wide. When considering traditional DSP back-ends, it is useful to satisfy two requirements:
1) Operating the data-converters at rates beyond 2B samples per second.
2) Having the digital processing circuits be clocked at the same speeds to operate in real-time.

Advances in data-converter design have been able to reach ultra-high sampling speeds. The use of interleaved data converter architectures along with modern process technologies have led to digital-to-analog converter and analog-to-digital converter DAC/ADC designs exceeding 100 GSps. A 240 GSps DAC that supports 100 GHz of bandwidth is reported in (X. Chen, S. Chandrasekhar, S. Randel, G. Raybon, A. Adamiecki, P. Pupalaikis, and P. J. Winzer, "All-electronic 100-ghz bandwidth digital-to-analog converter generating pam signals up to 190 gbaud," J. Lightwave Technol., vol. 35, no. 3, pp. 411-417, February 2017. [Online]. Available: https://opg.optica.org/jlt/abstract.cfm?URI=jlt-35-3-411). A few commercial devices also exist that feature DACs that support up to 70 GHz of bandwidth (Keysight Technologies. M8199A arbitrary waveform generator. Accessed: Nov. 30, 2020. [Online]. Available: https://www.keysight.com/us/en/assets/3120-1465/data-sheets/M8199A-128-256-GSa-s-Arbitrary-Waveform-Generator.pdf). Such devices and their capabilities are furthermore discussed in II. Similarly, analog-to-digital converters (ADCs) with 110 GHz of analog bandwidth sampling at 256 GSaps are commercially available (Infiniium UXR-series oscilloscopes. Accessed: Nov. 30, 2020.[Online]. Available: https://www.keysight.com/us/en/assets/7018-06242/data-sheets/5992-3132.pdf). Similarly, approaches have been shown to improve the capabilities of data-converters to support next generation of wireless communication. Although these capabilities are very promising, these technologies usually come at towering prices, high power consumption, and come in huge shapes and sizes making them impractical in a deployment scenario.

With Moore's law slowing down significantly, the clock frequencies that digital hardware can be operated at have become saturated. Currently, clock frequencies of application-specific integrated circuits (ASICs) (this depends on the complexity of the design) using cutting-edge complementary metal-oxide semiconductor (CMOS) processes are maxed out at a few GHz. Since THz technologies and standards are still being figured out, it is still too early to think of ASICs and there is a need for research communities to use programmable digital back-ends to conduct dynamic experimentation. Programmable digital hardware, such as field programmable gate arrays (FPGAs), have slower fabric and the maximum realizable circuit speeds are much lower than the ASICs due to the programmability involved. The maximum operable frequencies of the state-of-the-art FPGAs for modest designs max out at about 500 MHz and this imposes a major hindrance in realizing real-time wireless links at THz frequencies that can support at least a few GHz of bandwidth. Thus, there is a need of finding innovative solutions for alternative ways to do digital processing of ultra-broadband signals.

Based on capabilities of programmable digital hardware, multi-phase digital hardware architectures are useful to work with high-speed data converters. If the data-converter sampling rate is $f_s$ and the digital clock rate is $f_{clk}$, then $$\left\lceil \frac{f_s}{f_{clk}} \right\rceil$$

parallel copies of digital hardware would be employed to process the whole bandwidth.

Given that the available bandwidth of ultra-broadband signals of interest is in the order of tens of GHz, one feasible approach is to utilize a channelized back-end DSP architecture where multiple low-bandwidth channels are frequency multiplexed to form an ultra-broadband link. Such an architecture can be realized using a radio-frequency system on chips (RFSoCs) ([Online]. Available: https://www.xilinx.com/products/silicon-devices/soc/rfsoc.html) at a moderate cost. The RFSoCs are state-of-the-art in RF digital programmable hardware where multiple RF data converters are integrated onto the same chip alongside the programmable logic as a single system-on-chip. In the most recent generation (Gen-3) of RFSoCs (RFSoC product selection guide. [Online]. Available: https://www.xilinx.com/support/documentation/selection-guides/zynq-usp-rfsoc-product-selection-guide.pdf), each individual data converter supports up to 10 GSps sample rates at the DAC side and up to 5 GSps speeds at the ADC side. With multiple (8 or 16) data converters integrated on to a single SoC, a single RFSoC can accommodate up to a few tens of GHz in overall bandwidth. Thus, such architectures can be used to implement a channelized real-time signal processing back-end (V. Ariyarathna, A. Madanayake, and J. M. Jornet, "Real-time digital baseband system for ultra-broadband THz communication," in 2020 $45^{th}$ International Conference on Infrared, Millimeter, and Terahertz Waves (IRMMW-THz). IEEE, 2020, pp. 1-2.

FIG. 1A is a block diagram 90 of an example embodiment of a computer 105 that has an example embodiment a system 100 for real-time wireless communications implemented thereon. In the block diagram 90, a user 92 is using the computer 105 to communicate user data (not shown) with another user (not shown). The computer 105 is a laptop in the example embodiment; however, it should be understood that a computer disclosed herein is not limited to a laptop and may be any suitable machine capable of running an application layer to generate outgoing data and reciprocally consume (i.e., receive) incoming data. Such a computer may be a switch, server, personal computer, mobile device, Internet of Things (IoT) device, etc. for non-limiting examples. The computer 105 includes an example embodiment of a system 100 for real-time wireless communications implemented thereon. The system 100 includes a plurality of in-phase and quadrature (IQ) mixers and a power combiner, as disclosed below with regard to FIG. 1B-1.

Figures 1, 1B:
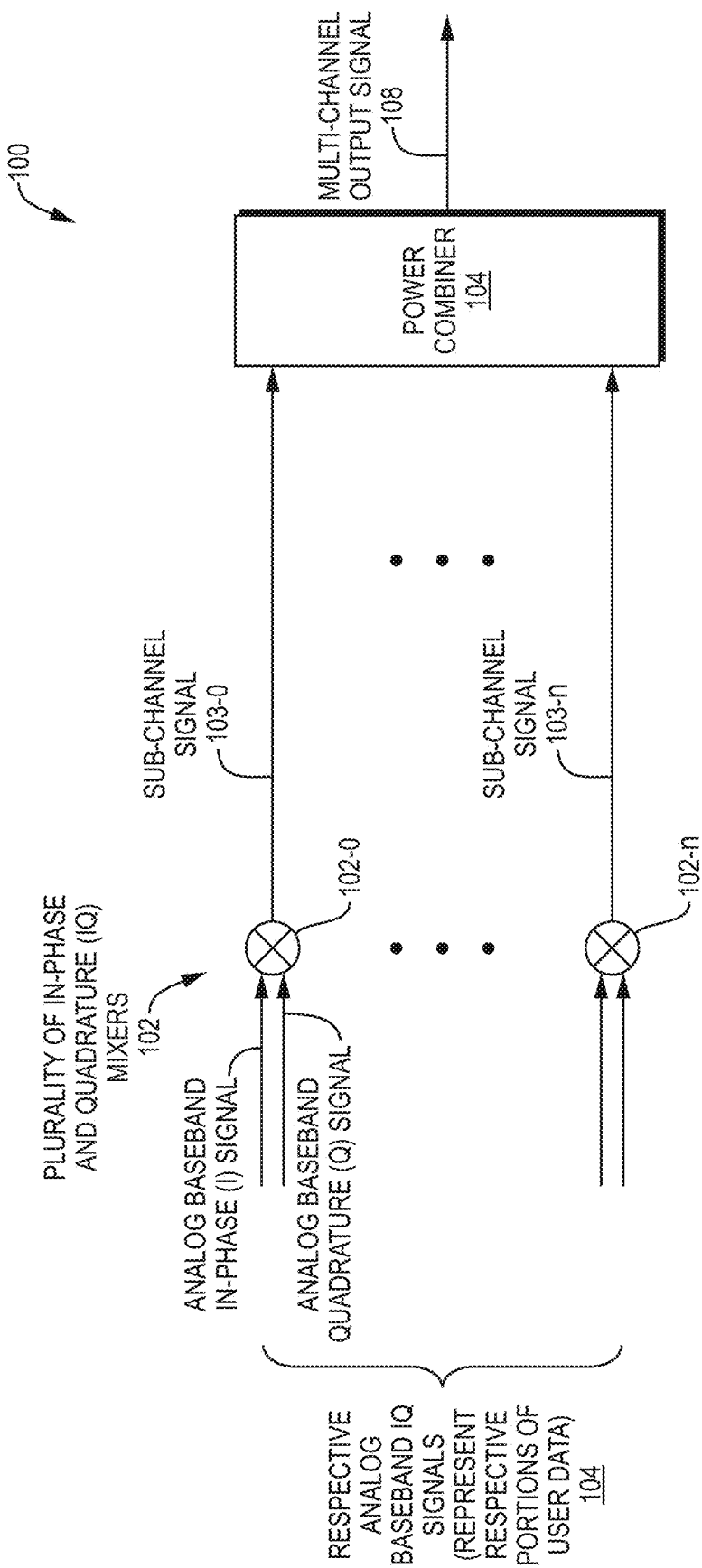
FIG. 1B-1 is a block diagram of an example embodiment of a system for real-time wireless communications.

FIG. 1B-1 is a block diagram of an example embodiment of a system 100 for real-time wireless communications. The system 100 comprises a plurality of in-phase and quadrature (IQ) mixers 102 (e.g., 102-0, . . . , 120-n) configured to produce in real-time on a per-channel basis, sub-channel signals (103-0, . . . , 103n) from respective analog baseband IQ signals 104 representing respective portions of user data (not shown). The system 100 further comprises a power combiner 104 configured to produce a multi-channel output signal 108 by frequency multiplexing, in real-time, the sub-channel signals produced. The multi-channel output signal 108 represents the user data in its entirety.

For non-limiting example, the system 100 may further comprise filters, as disclosed below with regard to FIG. 1B-2.

Figures 1, 1B, 2:
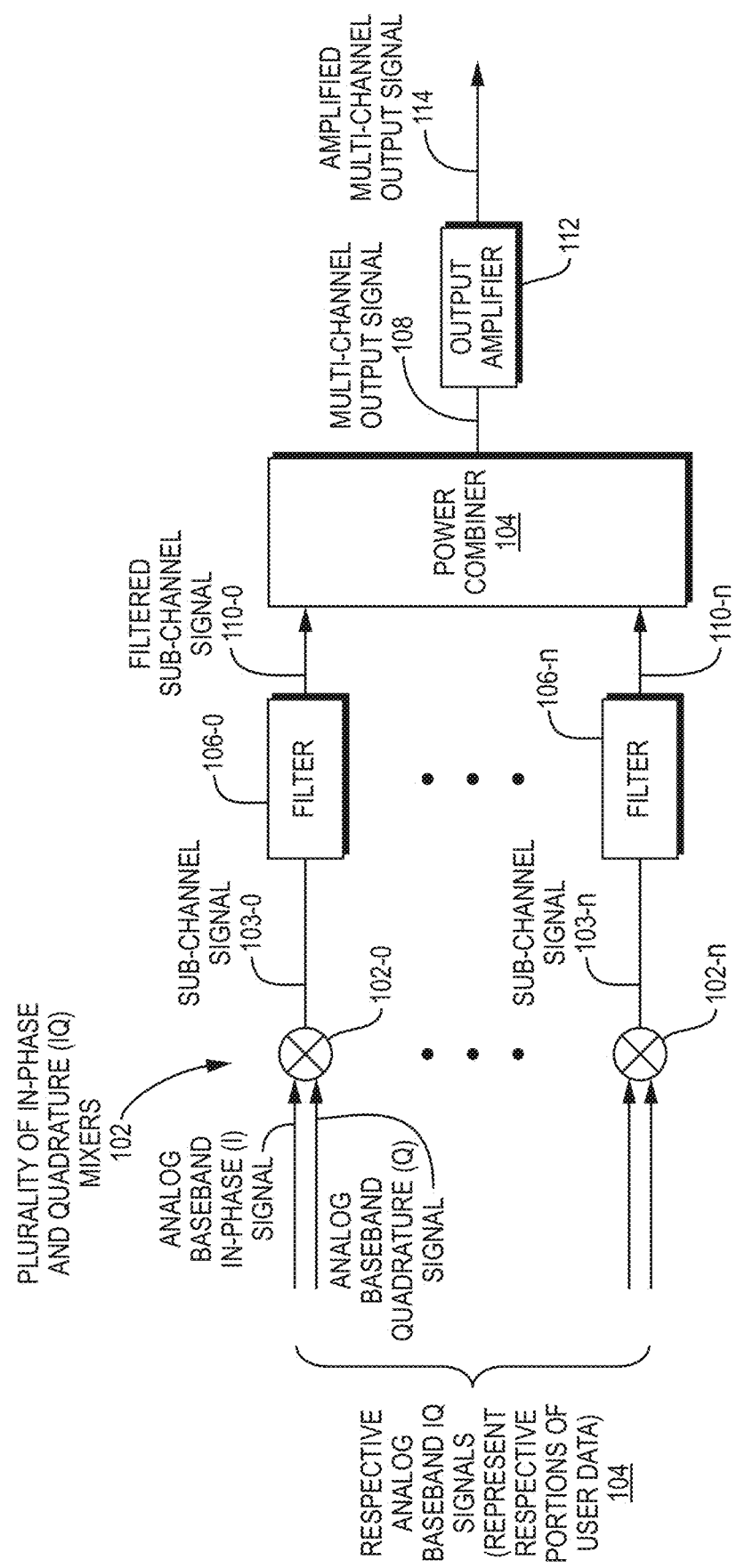
Figures 1, 1B, 2, 3:
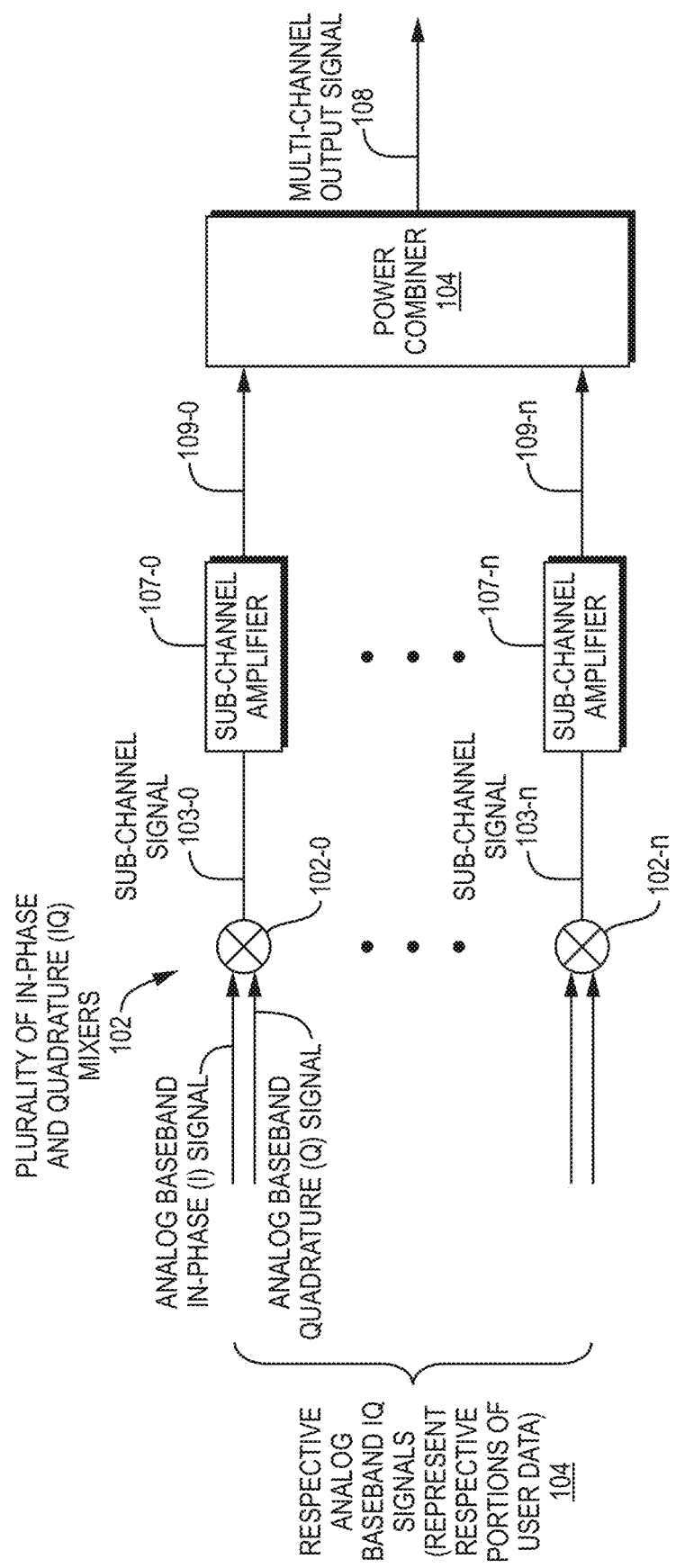

FIG. 1B-2 is a block diagram of an example embodiment of the system 100 of FIG. 1B-1. In the example embodiment of FIG. 1B-2, the system 100 further comprises filters (106-0, . . . , 106-n) coupled to respective IQ mixers of the plurality of IQ mixers 102. The filters (106-0, . . . , 106-n) may be configured to filter in parallel, in real-time on the per-channel basis, the sub-channel signals (103-0, . . . , 103n) produced. It should be understood; however, that such filters are optional. In the example embodiment of FIG. 1B-2, the power combiner 104 may be configured to produce the multi-channel output signal 108 by frequency multiplexing, in real-time, the sub-channel signals produced and filtered, namely the filtered sub-channel signals (110-0, . . . 110-n).

According to an example embodiment, the system 100 may include an output amplifier, such as the output amplifier 112. The output amplifier 112 may be coupled to the power combiner 104. The output amplifier 112 may be configured to produce, in real-time, an amplified multi-channel output signal 114 by amplifying the multi-channel output signal 108 produced by the power combiner 104. As such, the amplified multi-channel output signal 114 also represents the user data in its entirety. Alternatively, the system 100 may comprise sub-channel amplifiers, as disclosed below with regard to FIG. 1B-3.

FIG. 1B-3 is a block diagram of an example embodiment of the system 100 of FIG. 1B-1. In the example embodiment of FIG. 1B-3, the system 100 comprises sub-channel amplifiers (107-0, . . . 107-n) configured to amplify in parallel, in real-time on the per-channel basis, the sub-channel signals produced (103-0, . . . , 103n). It should be understood; however, that such sub-channel amplifiers are optional, and an output amplifier may be employed instead, such as the output amplifier 112 of FIG. 1B-2, disclosed above. In the example embodiment of FIG. 1B-2, the power combiner 104 may be configured to produce the multi-channel output signal 108 by frequency multiplexing, in real-time, the sub-channel signals produced and amplified, namely the amplified sub-channel signals (109-0, . . . 109-n).

Through the use of multiple data converter pairs, disclosed further below, and through analog IQ mixing (rather than digital IQ mixing) an example embodiment disclosed herein can create multi-GHz bandwidth channels that, with the use of the power combiner 104, combine the sub-channel signals (103-0, . . . 103-n) into the multi-channel output signal 108 that may be an ultra-broadband signal that is much higher in bandwidth relative to the individual sub-channel signals (103-0, . . . 103-n). Further example embodiments and details of such a system are disclosed below.

An example embodiment disclosed herein leverages the capabilities of such RFSoCs to fully develop a full-duplex software-defined radio (SDR) that may, for non-limiting example, operate in the 130-140 GHz frequency band while utilizing 8-GHz of bandwidth in real-time. It should be understood, however, that an example embodiment disclosed herein is not limited to such frequency band or bandwidth and may, for non-limiting example, operate at under 100 GHz. An overview of an example embodiment of an architecture of a communication system is disclosed below with regard to FIG. 1C.

Figure 1C:
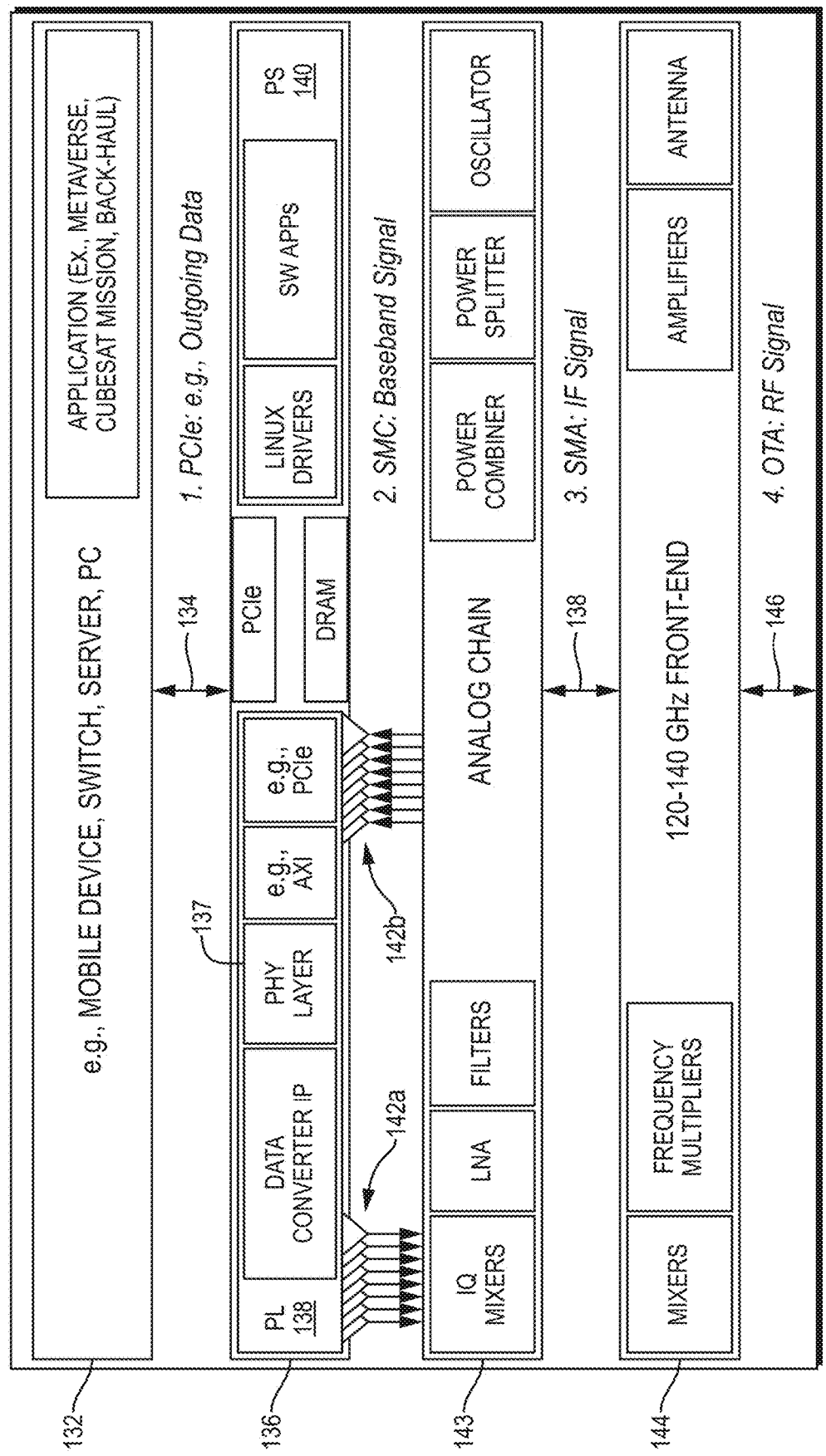
FIG. 1C is a block diagram of an example embodiment of an architecture for a real-time THz communications system.

FIG. 1C is a block diagram of an example embodiment of an architecture 130 for a real-time THz communications system. At an uppermost layer, a high-performance machine 132 running an application layer to generate or reciprocally consume incoming data may be employed. Such a machine may be the mobile device 102 of FIG. 1A, disclosed above, for non-limiting example, or a switch, server, personal computer (PC), or other machine for non-limiting examples. The outgoing/incoming stream of data 134 (also referred to herein as a digital data stream) may be passed between a baseband processor or RFSoC 136 and the application-running machine 132 through a high-speed interface, such as a Peripheral Component Interconnect Express (PCIe) or Quad Small Form-Factor Pluggable (QSFP) for non-limiting examples. The baseband processor or the RFSoC 136 may perform all physical layer (PHY), Medium Access Control (MAC), and synchronization operations by jointly utilizing Programmable Logic (PL) 138 and a Processing System (PS) 140 on the chip. The RFSoC 136 can then utilize the on-chip data converters (142a, 142b) to convert the digital data stream 134 to analog or vice versa. Finally, the multiplexed 4 channels are then passed as an intermediate frequency (IF) signal 138 to a front end 144 via a Sub-Miniature Version A (SMA) connection. An analog chain 143 may act as the middleman between the baseband RFSoC 136 and the RF front-end 144, as disclosed further below. The front end 144 may be configured to transmit a radio frequency (RF) signal 146 or vice versa. With adequate synchronization at the higher layers, multiple RFSoCs can be used in conjunction to increase the bandwidth of the system.

II. REVIEW OF STATE-OF-THE-ART COMMUNICATION TEST-BEDS SUPPORTING ABOVE 100 GHZ WIRELESS EXPERIMENTATION

With the increased interest in the ultra-broadband available bandwidth in the above-noted 100 GHz spectrum, many groups in academia and industry have been working toward developing systems that operate in those higher frequency bands. As the demands for higher data rates and low latency links continue to increase, this available bandwidth has the potential to accommodate such demands. With that being said, developing such systems that can operate at these frequencies and efficiently utilize the available bandwidth is a challenging task. On one hand, analog components that operate at these high frequencies incur high losses, thus, immediately reducing the signal-to-noise ratio (SNR) before transmission. On the other hand, sampling signals at these huge bandwidths require ultra-high-speed data converters that are currently very expensive and difficult to deploy. Nonetheless, many groups have taken the initiative to begin utilizing the available electronics in ways to pave the way for research and development to occur on those frequency bands. As such, many research groups in both academia and industry have been able to give birth to many THz experimental platforms (I. F. Akyildiz, C. Han, Z. Hu, S. Nie, and J. M. Jornet, "Terahertz band communication: An old problem revisited and research directions for the next decade," IEEE Transactions on Communications, vol. 70, no. 6, pp. 4250-4285, 2022). Those solutions can be classified into three different categories based on their capabilities: technology demonstrators, channel sounding systems, and communication testbeds. Technology demonstrators are platforms that are built around a certain technological solution whether hardware- or software-based to test and confirm its feasibility and demonstrate its working capabilities. As such, these platforms are limited in the sense of reconfigurability and fail to incorporate a more generalized deployable communication system. On the other hand, channel sounding systems often neglect the physical layer or implement a simple and limited physical layer to support channel measurements. Such measurements are useful for characterizing the spectrum features and in developing a channel model. Finally, a communication testbed includes a fully re-configurable physical layer that is easy to reprogram in order to support different hardware blocks, signal processing methods, or communication and networking protocols.

Most of the communication testbeds are either offline-based, in which the signals are stored in memory, which is later processed offline in Matlab®, or are real-time systems that do not fully utilize the available bandwidth due to data-converter limitations. In (National Instruments, "Introduction to the NI mmWave Transceiver System Hardware," White Paper, http://www.ni.com/product-documentation/53095/en/, 2019), National Instruments (NI) proposes reusing its original mmWave communication testbed for sub-THz by simply replacing the front-ends and the carrier frequency. Although such implementation is in fact real-time, reconfigurable, and contains a fully implemented physical layer, it fails to encompass the main attraction offered by THz: bandwidth. The NI nodes only offer up to 2 GHz of useable bandwidth which is a fraction of what the THz band has to offer. In (Keysight Technologies. M8199A arbitrary waveform generator. Accessed: Nov. 30, 2020. [Online]. Available: https://www.keysight.com/us/en/assets/3120-1465/data-sheets/M8199A-128-256-GSa-s-Arbitrary-Waveform-Generator.pdf), Keysight demonstrates an arbitrary waveform generator (AWG) that has access to 25 GHz of bandwidth through its high-speed DAC of 65 GSa/s, and a digital storage oscilloscope (DSO) acting as the receiver with its high-speed ADC that can sample up to 128 GSa/s. Although this testbed utilizes high-speed D/C and communicates over huge bandwidths, it is an offline-based system and happens to be very expensive. In (S. Abu-Surra, W. Choi, S. Choi, E. Seok, D. Kim, N. Sharma, S. Advani, V. Loseu, K. Bae, I. Na, A. A. Farid, M. J. W. Rodwell, G. Xu, and J. C. Zhang, "End-to-end 140 ghz wireless link demonstration with fully-digital beamformed system," in 2021 IEEE International Conference on Communications Workshops (ICC Workshops), 2021, pp. 1-6), Samsung Research lab has demonstrated a communication platform capable of up to 32 Gbps over two 2-GHz wide aggregated channels and 2 MIMO streams. The platform is capable of adaptive beamforming at the transmitter and the receiver. In (P. Sen, V. Ariyarathna, A. Madanayake, and J. M. Jornet, "A versatile experimental testbed for ultrabroadband communication networks above 100 ghz," Computer Networks, vol. 193, p. 108092, 2021.[Online]. Available: https://www.sciencedirect.com/science/article/pii/S1389128621001778), the authors were able to demonstrate an off-line link at 120-140 GHz over 5 meters utilizing a high-speed DSO at the receiver to capture the signal in baseband and process it offline in Matlab. Nonetheless, a data rate of 40 Gbps over 20 GHz of bandwidth was achieved while utilizing a 16-PSK modulation technique. A summary of the mentioned testbeds is tabularized in FIG. 1D, disclosed below.

FIG. 1D is a table 150 that provides a comparison of state-of-the-art communication terahertz (THz) testbeds. The table 150 may be referred to interchangeably herein as Table I. The table 150 includes an overview of technology 151, frequency 152, antenna gain 153, number of channels 154, bandwidth 155, theoretical max bit-rate 156, and demonstrated data-rate 157 for different testbeds of a team 158, namely, of Keysight 159 (Keysight Technologies. M8199A arbitrary waveform generator. Accessed: Nov. 30, 2020. [Online]. Available: https://www.keysight.com/us/en/assets/3120-1465/data-sheets/M8199A-128-256-GSa-s-Arbitrary-Waveform-Generator.pdf), Samsung 160 (S. Abu-Surra, W. Choi, S. Choi, E. Seok, D. Kim, N. Sharma, S. Advani, V. Loseu, K. Bae, I. Na, A. A. Farid, M. J. W. Rodwell, G. Xu, and J. C. Zhang, "End-to-end 140 ghz wireless link demonstration with fullydigital beamformed system," in 2021 IEEE International Conference on Communications Workshops (ICC Workshops), 2021, pp. 1-6.), UNLAB 161 (P. Sen, V. Ariyarathna, A. Madanayake, and J. M. Jornet, "A versatile experimental testbed for ultrabroadband communication networks above 100 ghz," Computer Networks, vol. 193, p. 108092, 2021. [Online]. Available https://www.sciencedirect.com/science/article/pii/S1389128621001778), National Instructions 162 (National Instruments, "Introduction to the NI mmWave Transceiver System Hardware," White Paper, http://www.ni.com/product-documentation/53095/en/, 2019.), and UNLAB 163, namely a testbed implemented according to an example embodiment disclosed herein. As understood, there has been no full system demonstration or proof-of-concept for a real-time system above 100 GHz that is capable of processing up to 8 GHz of bandwidth—thus making an example embodiment of a system disclosed herein to be the fastest software-defined-radio.

III. EXAMPLE EMBODIMENT OF A TEST-BED ARCHITECTURE

A. Overview of an Example Embodiment of a Real-Time Ultra-Broadband Test-Bed

With reference back to FIG. 1C, disclosed above, a high-level overview of an example embodiment of real-time testbed with all its components and interconnections is disclosed. The RFSoC 136 contains two main components that that may be relied on to create a low-complexity re-configurable SDR: PL 138, and PS 140. An example embodiment may utilize the PL 138 mainly for the physical layer implementation due to its nature for parallelism and high-speed performance when compared to the processing system, that is, the PS 140. With that in mind, an example embodiment may program the wireless communication blocks on the PL 138 alongside all the Intellectual Property (IPs) used for the system to function. On the PS 140 side, the driver code and user space applications may be programmed to interact with the PL 138 to provide real-time control over the physical layer 137. Upper networking layers (not shown) may be implemented on the PS 140 as well. At the output of the RFSoC 136, the data converters (142a, 142b) may be coupled via SMC to SMA cables to the analog chain 143. The analog chain 143 acts as the middleman between the baseband RFSoC 136 and the RF front-ends 144. The analog chain 143 receives the I and Q streams (not shown) for each channel and performs IQ mixing and up-conversion with a unique frequency and finally performs channel multiplexing at the output to be passed to the front ends 133 as disclosed herein. Finally, at the front end 144s, the signal may be up-converted to 130 GHz by utilizing frequency multipliers (not shown) embedded in the front ends 144 and transmit the signal 145 over the air (OTA).

B. Upper Mm-Wave/THz Front-Ends

Figure 2A:
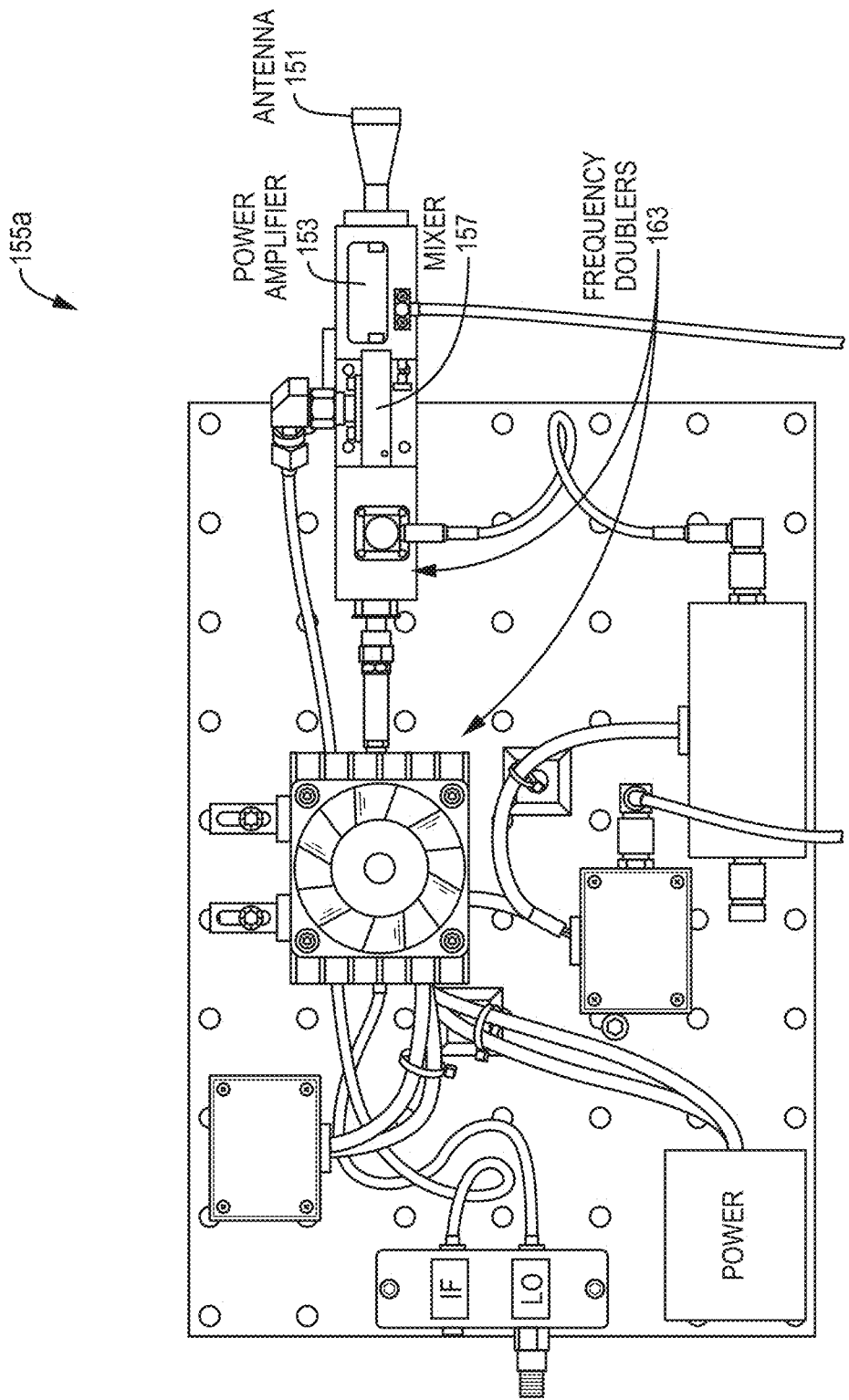
FIGS. 2A-B are images of example embodiments of custom-made analog front-ends.
Figure 2B:
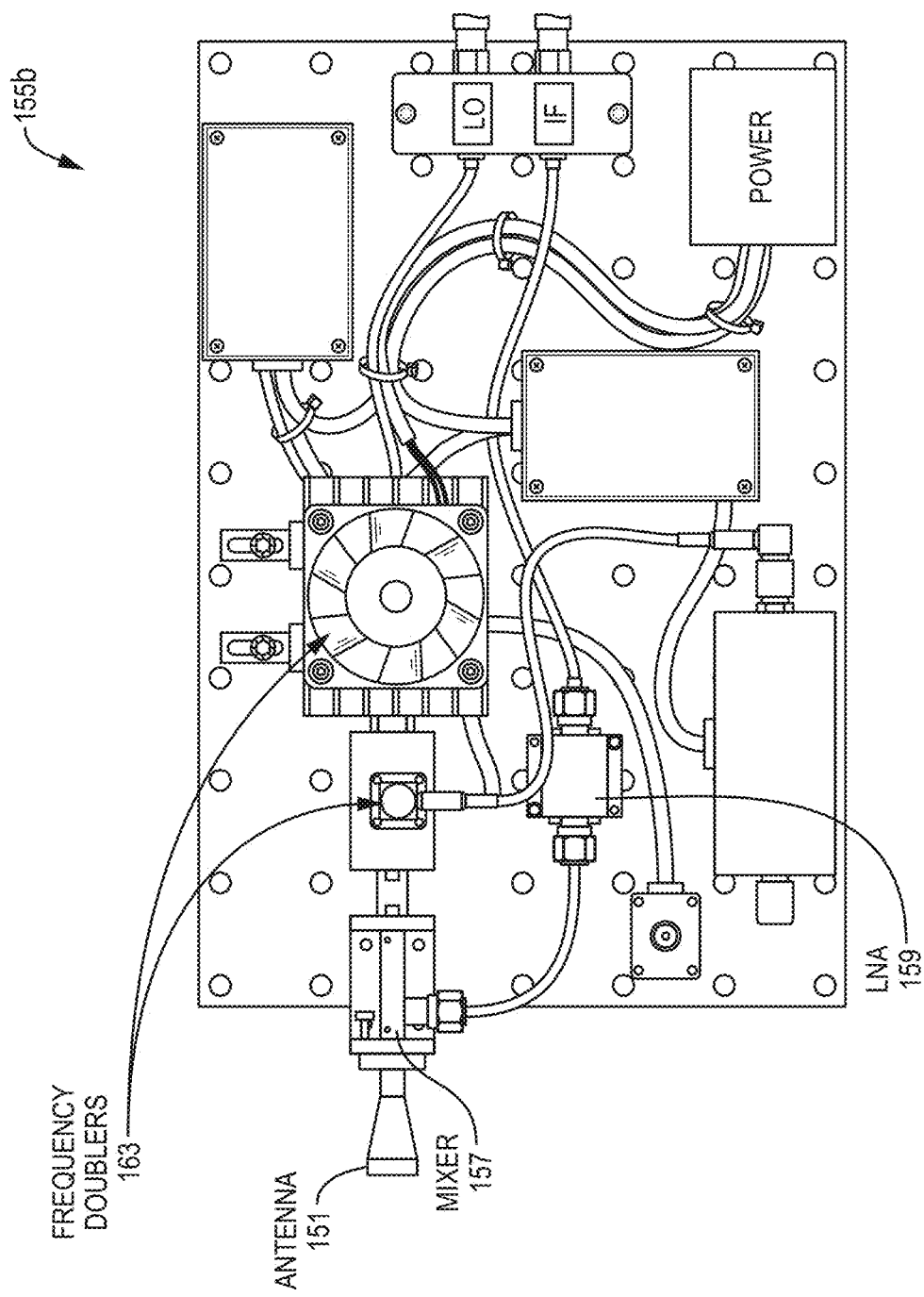

FIGS. 2A and 2B are images (155a, 155b) of example embodiments of custom-made analog 120-140 GHz front-ends made by Virginia Diodes utilized for a testbed disclosed herein. At both the transmitter, shown in image 155a, and receiver, shown in the image 155b, side, a high gain horn antenna 151 with 38 dBi gain was utilized, along with a power amplifier 153, mixer 157, low noise amplifier (LNA) 159, and frequency doublers 163. The testbed utilized the 120-140 GHz front-ends given that it provides the highest SNR in the sub-THz region while allowing communication over 8 GHz of bandwidth for non-limiting example. With that being said, the modular testbed allows for swapping out the front ends and using any other frequency band without having to change the baseband modem or the analog IF chain. The front-ends utilize two frequency doublers 163 allowing for a multiplication factor of 4; such that a starting LO frequency is 32.5 GHz, which then gets up-converted to 130 GHz. The front ends also contains a double side-band mixer with 7 dB conversion loss that modulates the incoming IF from the output of the analog chain. At the RF, a maximum output power of 20 mW is achieved by a power amplifier with a 20 dB gain.

IV. DESIGN AND IMPLEMENTATION OF AN EXAMPLE EMBODIMENT OF A SIGNAL PROCESSING BACK-END

A. System Level Design

Given the capabilities of Gen-1 RFSoCs (boards employed herein), an example embodiment of a system may be designed to take advantage of these capabilities to unlock the maximum tolerable bandwidth set the by the hardware. Given that the ADCs on chip have lower sampling rates than the DACs, an example embodiment of a system may be designed to operate at the ADC maximum sampling rate of 4.096 GSa/s. Since an example embodiment may rely on frequency multiplexing the sub-channels and given the sampling limitations of our data-converters, it is more bandwidth efficient to utilize an analog IQ mixing methodology instead of a digital approach. With that in mind, an example embodiment may clock an FPGA at 128 MHz and utilize 16 phases to achieve a sampling rate of 2.048 GSa/s. Given that an example embodiment may utilize two data-converters per-channel, one for the in-phase and one for the quadrature baseband signals, an example embodiment may extend a DSP engine in-to 16-phases for the in-phase and another 16 phases for the quadrature. Finally, an example embodiment may interpolate/decimate the signal by a factor of 2 to relax the analog filtering requirements of anti-imaging and anti-aliasing.

B. Waveform and Frame Format

When it comes to the waveform design in regards to the next generation of wireless communications, there has been many different proposed options in the landscape of single and multi-carrier solutions. In (H. Sarieddeen, M. S. Alouini, and T. Y. Al-Naffouri, "An overview of signal processing techniques for terahertz communications," Proceedings of the IEEE, vol. 109, no. 10, pp. 1628-1665, 2021), the author address some of the challenges and limitations of the THz band and compares the usage of single carrier versus multi-carrier based wave-forms. The authors in (J. B. Doré, Y. Cone, S. Bicais, J. Palicot, E. Faussurier, D. Ktenas, and F. Bader, "Above-90 ghz spectrum and single-carrier waveform as enablers for efficient tbit/s wireless communications," in 2018 $25^{th}$ International Conference on Telecommunications (ICT), 2018, pp. 274-278), favor single-carrier modulation techniques to that of multi-carrier given the high PAPR and tight synchronization requirements introduced by multi-carrier solutions. Similarly in IEEE 802.15.3d, which is considered the first standardized solution for sub-THz consists of a single-carrier methodology for the physical layer waveform (V. Petrov, T. Kurner, and I. Hosako, "Ieee 802.15.3d: First standardization efforts for sub-terahertz band communications toward 6 g," IEEE Communications Magazine, vol. 58, no. 11, pp. 28-33, 2020). Nonetheless, it is still unclear which physical layer waveform will be the best suited sub-THz/THz communication. To wit, our physical layer waveform utilizes an OFDM architecture given its nature for parallelism and simplistic channel equalization implementation for a high-speed real-time system. Due to the ultra-wide bandwidth supported by the front ends of the current testbeds, a stronger contribution to the overall channel frequency selectivity comes from the hardware electronics. Initial measurements using the 120 GHz front-ends were carried out to determine the sub-carrier spacing such that the sub-channels can be regarded as frequency flat. The measurement showed that this is met for bandwidths<50 MHz per sub-carrier and thus an FFT size of 64 was used to design the PHY layer.

Since the baseband is clocked at 2.048 GHz, sub-carrier spacing for the implementation is 32 MHz. The digital cores are designed to support up to a 64-QAM modulation technique with the option of adaptive modulations at the sub-carrier level. The physical layer frame structure has been implemented with close resemblance to 802.11a standard due to the choice of 64-point FFT size. Similarly, an example embodiment may utilize the same header sequence utilized in 802.11a for packet detection, timing acquisition, frequency offset estimation, and channel estimation. The 802.11a consists of a header which is divided into a short-training field (STF), and a long-training field (LTF) followed by the data payload that consists of OFDM symbols.

Figures 3A, 3B:
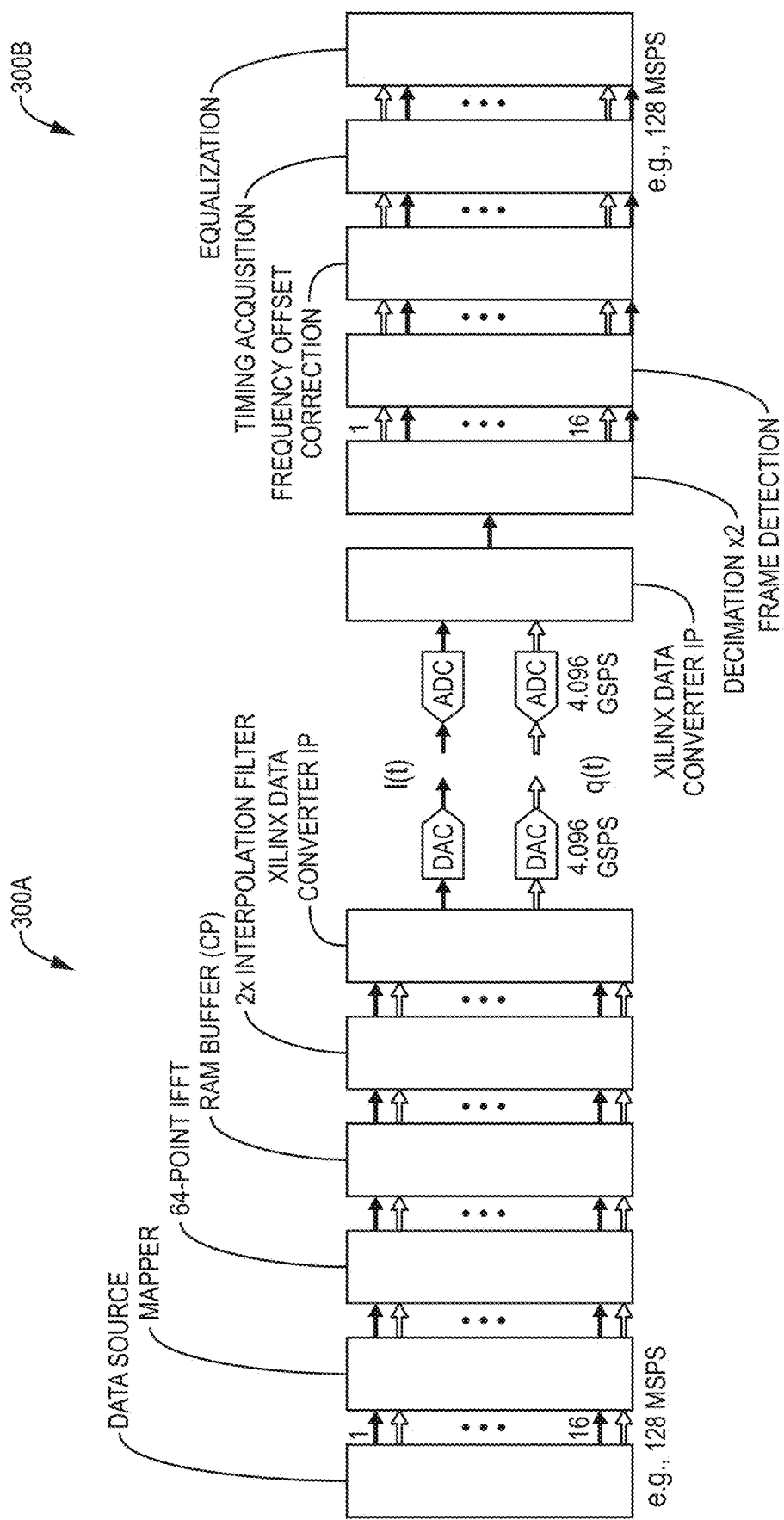
FIG. 3A-B are block diagrams of an example embodiment of a digital architecture of an ultra-broadband orthogonal frequency division multiplexing (OFDM) transceiver.
Figure 4:
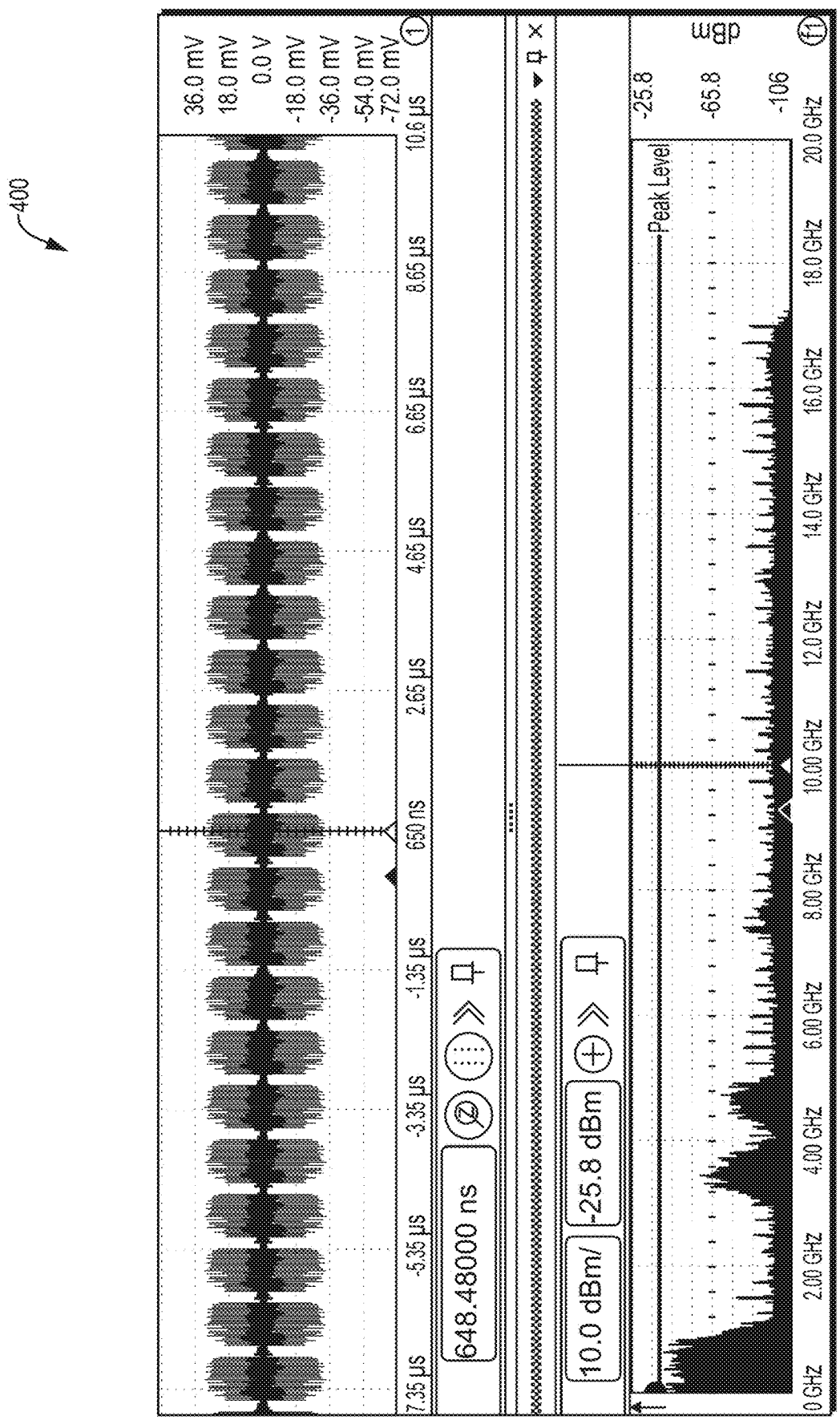
FIG. 4 is a screen capture of an example embodiment of a channel-1 waveform in baseband.

1) Digital back-end: The architecture 300A of the transmitter-side digital blocks is shown in FIG. 3A which implements the conventional OFDM-based digital transmitter. The transmitter blocks utilize the output clock provided by the on-chip DAC which is configured for 128 MHz, thus allowing the digital to be synchronized with the data-converter block. When parellizing the digital model by 16 phases to achieve the target sampling rate of 2.048 GSa/s. The data to be transmitted can either be random data generated in real-time using our custom 16-phased random data generator or real-time data that is being sent through AXI-Stream in real-time from the ARM host. In FIG. 4, a DSO capture 400 of the in-phase and quadrature components is shown for the first baseband channel. The payload, being sent for each packet occupies 52 out of the 64 sub-carriers. Following the IEEE802.11a standard, 12 sub-carriers are nulled out to provide guard bands and avoid leakage between channels. It is useful to note that the header being utilized may be the same header from IEEE 802.11a in which only occupies 52 out of the 64 sub-carriers. With that being said, when using the header for channel estimation one can only estimate the channel for the corresponding 52 sub-carriers and thus one may disregard the remaining 12 sub-carriers. Nonetheless, due to the filters utilized post-up-conversion, and due to the 500 MHz guard band between channels; it has been seen that those 12 sub-carriers can be utilized for data without any significant change in the error vector magnitude (EVM). Anyhow, a data-rate calculation disclosed herein takes into account that an example embodiment may only using 52 out of the 64 for data at the time being, but one can effectively increase the data rate from 16 to 20 Gbps by using all 64 sub-carriers if need be.

Figure 5A:
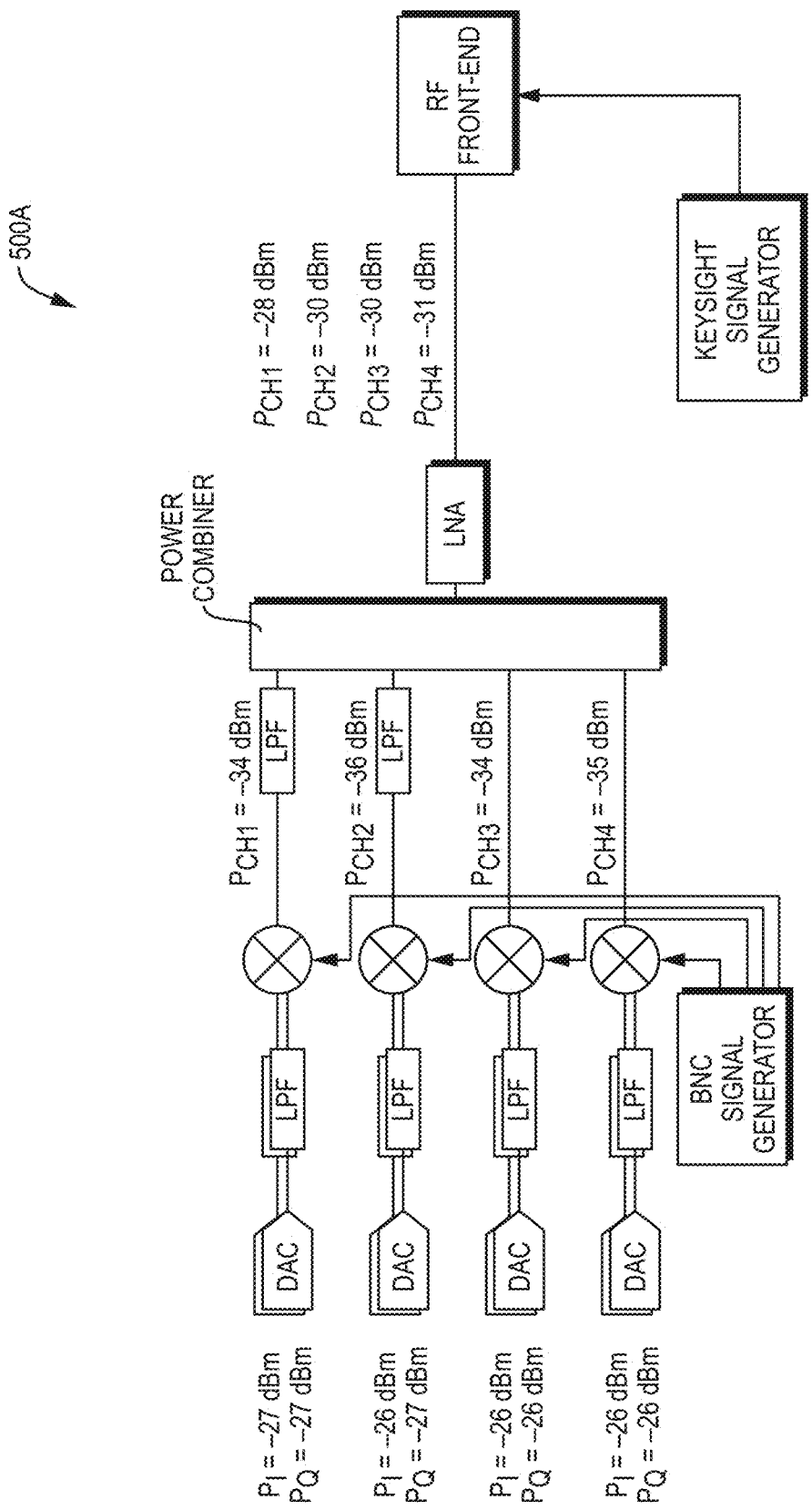
FIGS. 5A-B are analog architecture diagrams of example embodiments of a multi-channel ultra-broadband system.
Figure 6A:
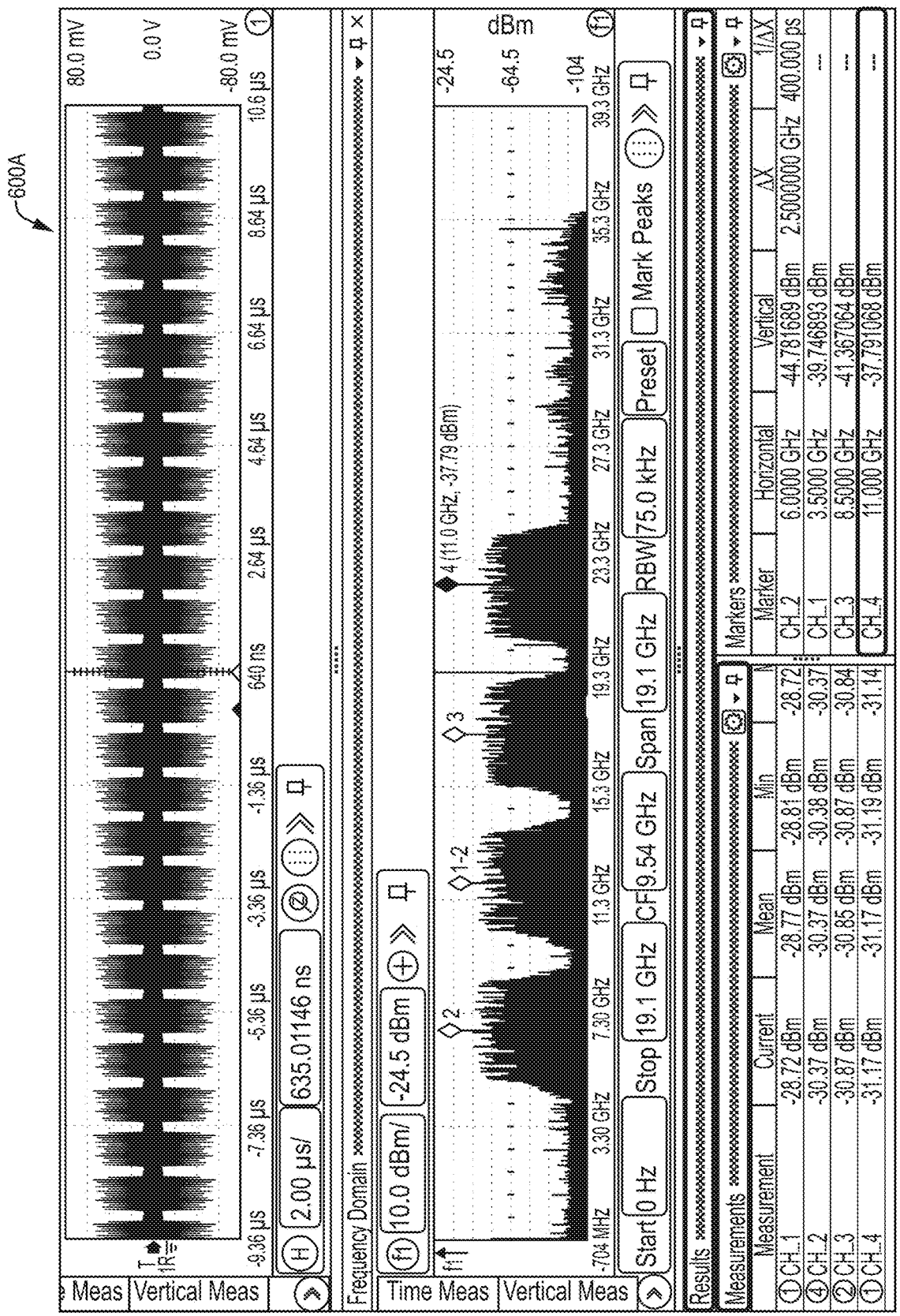
FIGS. 6A-B are screen captures of example embodiments of a radio frequency (RF) front-end intermediate frequency input capture.

2) Analog IF Network: Given that the data-converters are set to operate at a sampling rate of 4.096 GSa/s, an example embodiment can generate a 2.048 GHz wide baseband signal. The DAC out-puts the baseband signal with 32 mA of output current and roughly −26 dBm of power when measured with a DSO. The technique utilized to allow transmit data over 8 GHz of bandwidth is to utilize all 4 data-converter pairs (2 DACs and 2 ADCs per channel) for simultaneous data transmission/reception via channel multiplexing. In FIG. 5A, a detailed transmitter diagram 500A of an example embodiment of an analog architecture is shown with all the components used to achieve our results. Given that on off-the-shelf analog components were employed for non-limiting example, and not custom-made components tailored to specific frequencies and power requirements, it is understood that this architecture will yield the best results considering a multi-channel system. For instance, instead of amplifying the in-phase and quadrature separately, the modulated signal may be amplified post-IQ mixing and the impact of IQ imbalance may be reduced. However, that may necessitate a custom-made amplifier tailored for the frequency range of each channel. For instance, for channel-1, an amplifier that would operate from 2.5 to 4.5 GHz is needed such that it won't amplify the second copy produced by the IQ mixer that could potentially interfere with the other channels. However, since such amplifiers don't exist, was used instead to amplify all four channels after multiplexing them. It is also useful to keep in mind, that the final aggregated signal may be fed into front-ends that can handle a max input power of 0 dBm and, thus, if the signal is amplified post IQ mixing it is useful to consider a small gain amplifier or attenuation post-amplification. When amplifying the entire four-multiplexed channels, the amplifier will also amplify any harmonics and leakages that might interfere with neighboring channels. On that end, it is important to use filters post-up-conversion to filter out any leakages and additional harmonics. For non-limiting example, the IQ mixers were driven with a unique LO that is channel-dependent using Berkeley Nucleonics (BNC) generator (825-M-20-4CH-R). This model has 4 independent LO channels, and each channel was utilized to up-convert the signal during the IQ-mixing stage. This generator can go up to 20 GHz of frequency, with phase noise of −120 dBc/Hz at 1 kHz offset at 1 GHz frequency. In FIG. 6A, a DSO capture 600A of the 4 channels being driven as input to the transmitter side RF front-end is illustrated. Finally, using the values in Table II, the total noise factor of the analog IF chain at the transmitter side can be calculated using the equation below:

$$NF_{Total} = NF_1 + \frac{NF_2 - 1}{G1} + \frac{NF_3 - 1}{G1 * G2} + \frac{NF_4 - 1}{G1 * G2 * G3} = 14.83 \text{ dB}$$

TABLE II

TRANSMITTER SIDE ANALOG COMPONENT SPECS

| Component | Noise Factor [dB] | Gain [dB] |
|---|---|---|
| Low Pass Filter | 1.7 | −1.7 |
| IQ Mixer | 12 | −8.0 |
| Low Noise Amplifier | 2.4 | 17 |
| Power Combiner | 1.2 | −1.2 |

C. Receiver-Side

Digital back-end: In FIG. 3B, the high-level overview 300B of the receiver DSP blocks is illustrated starting from the decimation to the channel estimation and equalization. Given that the on-chip ADCs run on a 256 MHz clock, the clock was converted from 256 to 128 MHz and re-sample the incoming samples at that lower clock to keep the design consistent with the 16-phase architecture being used at both TX and RX digital back-end. From there, the samples were passed to the frame detection IP that performs a 16-time-shifted auto-correlation (16 being the repetition period of the STF in the header). Simultaneously, a search for the LTF peaks by cross-correlating the samples with the known LTF sequence through the timing acquisition IP was performed. Given that the LTF samples are after the STF samples, the output of the timing acquisition may be checked after the frame detection detects a packet. Due to the latency of the frame-detection and timing acquisition IPs, the incoming samples are stored in a buffer such that when the timing synchronization is accomplished, the data symbols may still be accessed.

Figure 5B:
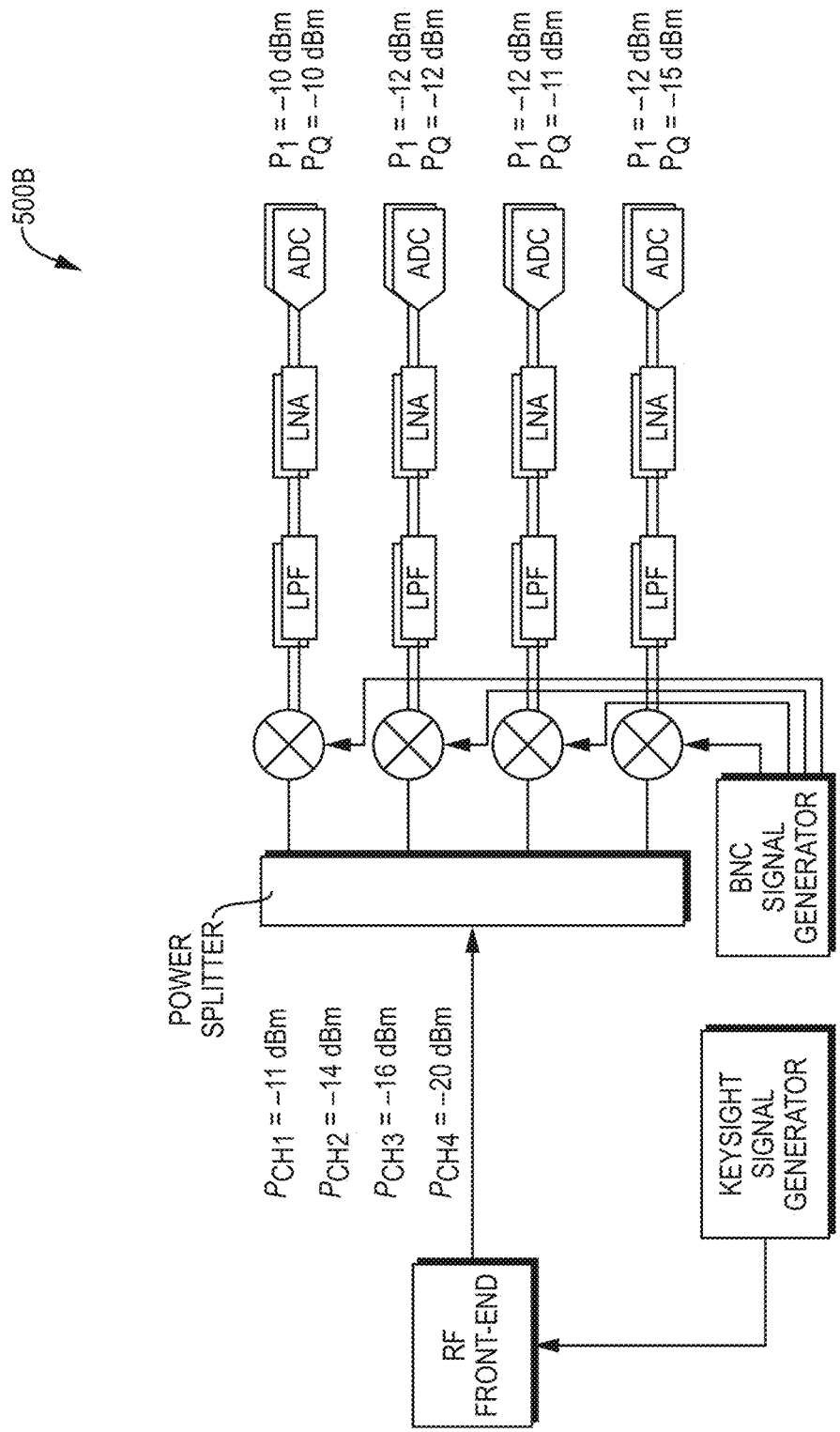

2) Analog IF network: In FIG. 5B, a detailed architecture of the analog system utilized at the receiver side is illustrated. As can be appreciated from FIG. 5B, it is very similar to that of the transmitter side. The main challenge here is to utilize the least amount of analog components to reduce the additional added noise, but at the same time meet the input/output requirements of each analog component. On one hand, if the high gain 32 dBi antenna horn at the receiver is utilized, it is useful to ensure a distance long enough between the front ends to minimize the impact of multi-path on the signal. On the other hand, if the 21 dBi gain antenna is utilized, the signal is much weaker and below the typical value of which the IQ mixer has its best performance.

Figure 6B:
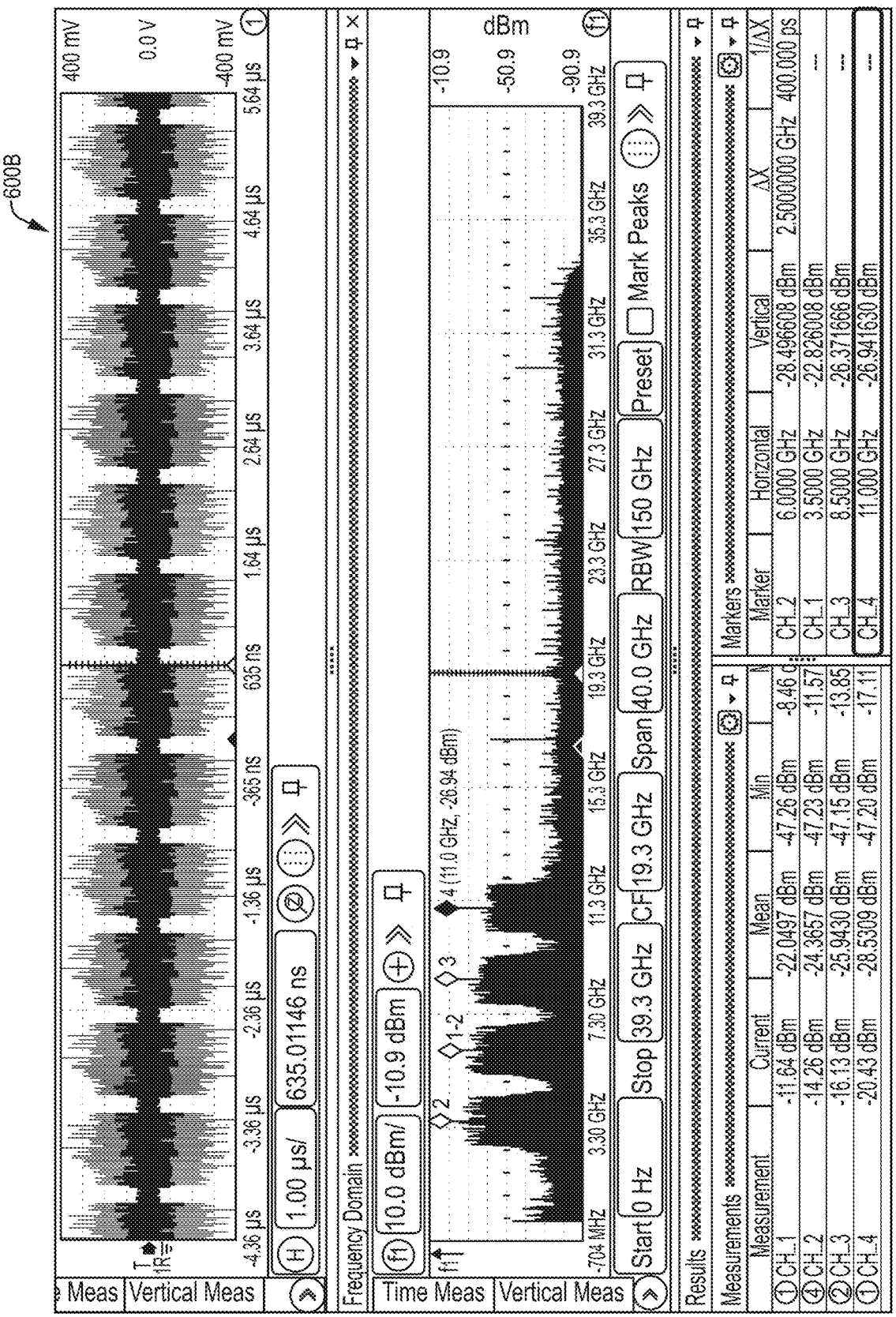

In FIG. 6B, a DSO capture 600B of the 4 channels being driven out of the receiver RF front-ends at a distance of 9 feet utilizing the 32 dBi horn antennas is illustrated. Considering that the IQ mixer has a conversion loss of almost 10 dB, the signal will need to be further amplified otherwise it will be too weak for the ADC to sample. As seen here, using off-the-shelf components is not an ideal way to have this system operating at its max capacity and performance but nonetheless, it was possible to demonstrate a working end-to-end system with what is available. Given that the first two channels are stronger than the last two, attenuators were placed to balance out all four channels right after the power splitter. After down-converting the signal, a low pass filter was employed to filter out the out-of-band signals and noise, and then amplify the baseband in-phase and quadrature components. Given that the amplifier on hand provides a 30 dB gain which outputs a signal too strong for the RFSoC data converters, it was useful to attenuate before sampling the signal. Finally, using the values in Table III, one can calculate the total noise factor of the analog IF chain at the receiver side using the equation below:

$$NF_{Total} = NF_1 + \frac{NF_2 - 1}{G1} + \frac{NF_3 - 1}{G1*G2} + \frac{NF_4 - 1}{G1*G2*G3} = 14.48 \text{ dB}$$

TABLE III

RECEIVER SIDE ANALOG COMPONENT SPECS

| Component | Noise Factor [dB] | Gain [dB] |
|---|---|---|
| Power Splitter | 1.2 | −1.2 |
| IQ Mixer | 12 | −8.0 |
| Low Pass Filter | 1.7 | −1.7 |
| Low Noise Amplifier | 1 | 30 |

V. EXPERIMENTAL RESULTS

A. Challenges and Impairments

1) Digital Baseband: One of the biggest challenges in the digital domain is the ability to process incoming samples at high speed (low latency). When considering the THz band for wireless communication solutions for its enormous bandwidth availability, it is important to consider the digital domain processing methodology. With such high bandwidth, devices are communicating at very high speeds that might overflow the baseband modem memory if the digital back end is not optimized for bandwidth. With that being said, our custom solution for our prototype was to implement the entire baseband engine in a parallelized manner on an FPGA. In order to do so, it was desirable to start off with a simple physical layer that can easily allow for this sort of parallelism; thus, the IEEE802.11a standard was selected and implemented for non-limiting example. Although, having a parallelized approach solves the challenge of having to digitally process data at a high sampling rate when the clock frequency is constrained, it makes designing a system more complex all while consuming more hardware resources.

2) Analog IF Chain: When it comes to the analog IF chain, one of the biggest challenges was to utilize off-the-shelf components that can match our frequency, bandwidth, and power requirements. Given that the analog IF chain operates between 1 to 12 GHz, a lot of different options were identified that can suffice for a prototype platform. Other challenges that arise from the analog IF chain are IQ imbalances, power leakage, non-linear distortion, and frequency offset. Most of those challenges can be solved using DSP solutions that are left for future work.

3) RF120-140 GHz Front-end: The most critical impairment introduced by the RF front-ends is the phase noise that results from the frequency multipliers that up-convert a relative low LO frequency to the sub-THz band. It is known that phase noise increase with the number of multipliers present as governed by this equation. 20*log (Multiplication Factor). Nonetheless, there are simple ways to overcome this challenge such as connecting both signal generators to the same 10 MHz clock for reference, or alternatively, you can down-convert your signal with a different LO and then overcome that frequency difference in the IF analog chain. It is also important to note that there are many recent phase estimation and correction methods that can be utilized to compensate for the phase noise in this setup.

B. Experimental Setup

Figure 9A:
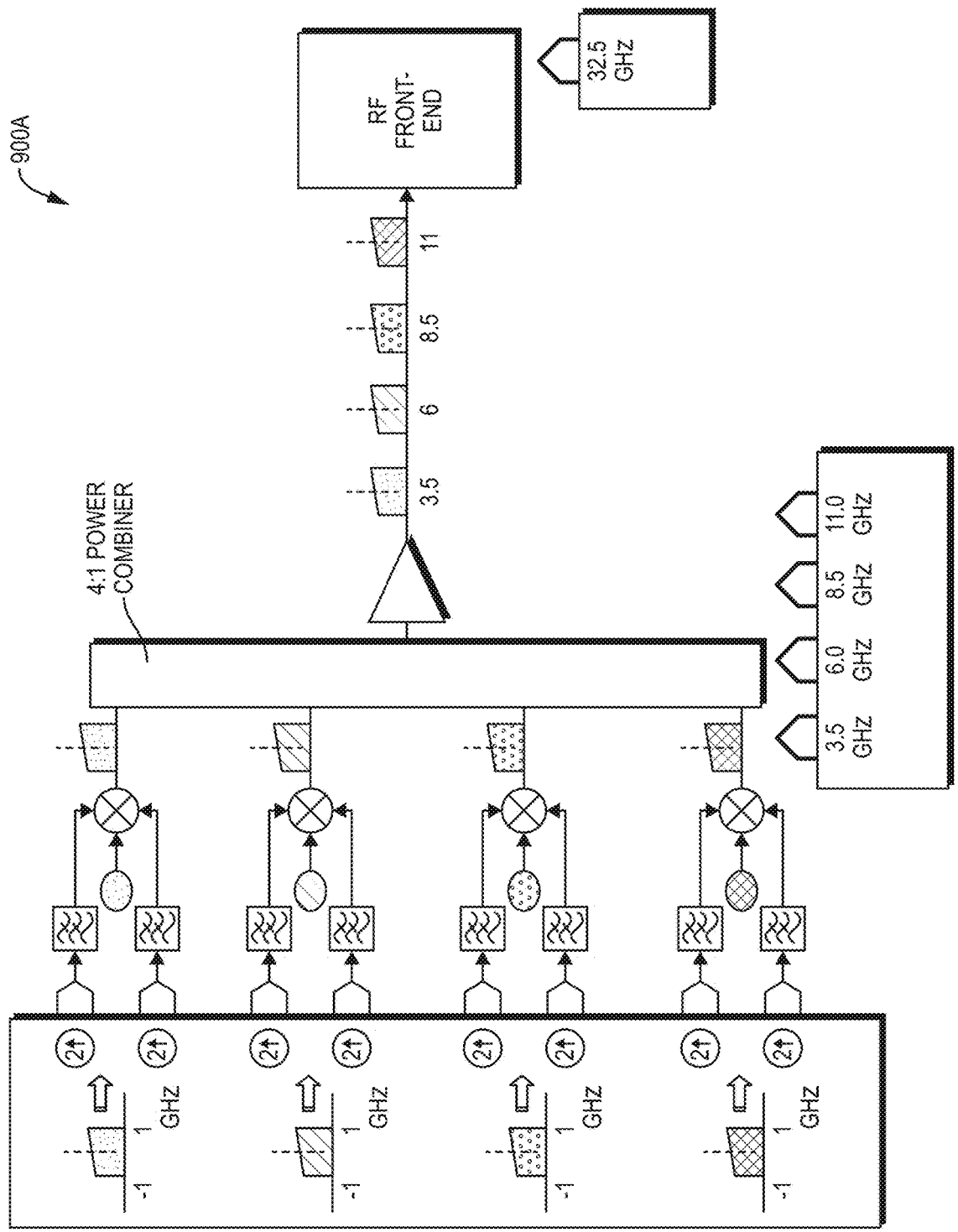
FIGS. 9A-B are block diagrams of an example embodiment of a setup for a real-time multi-channel ultra-broadband transceiver.
Figure 9B:
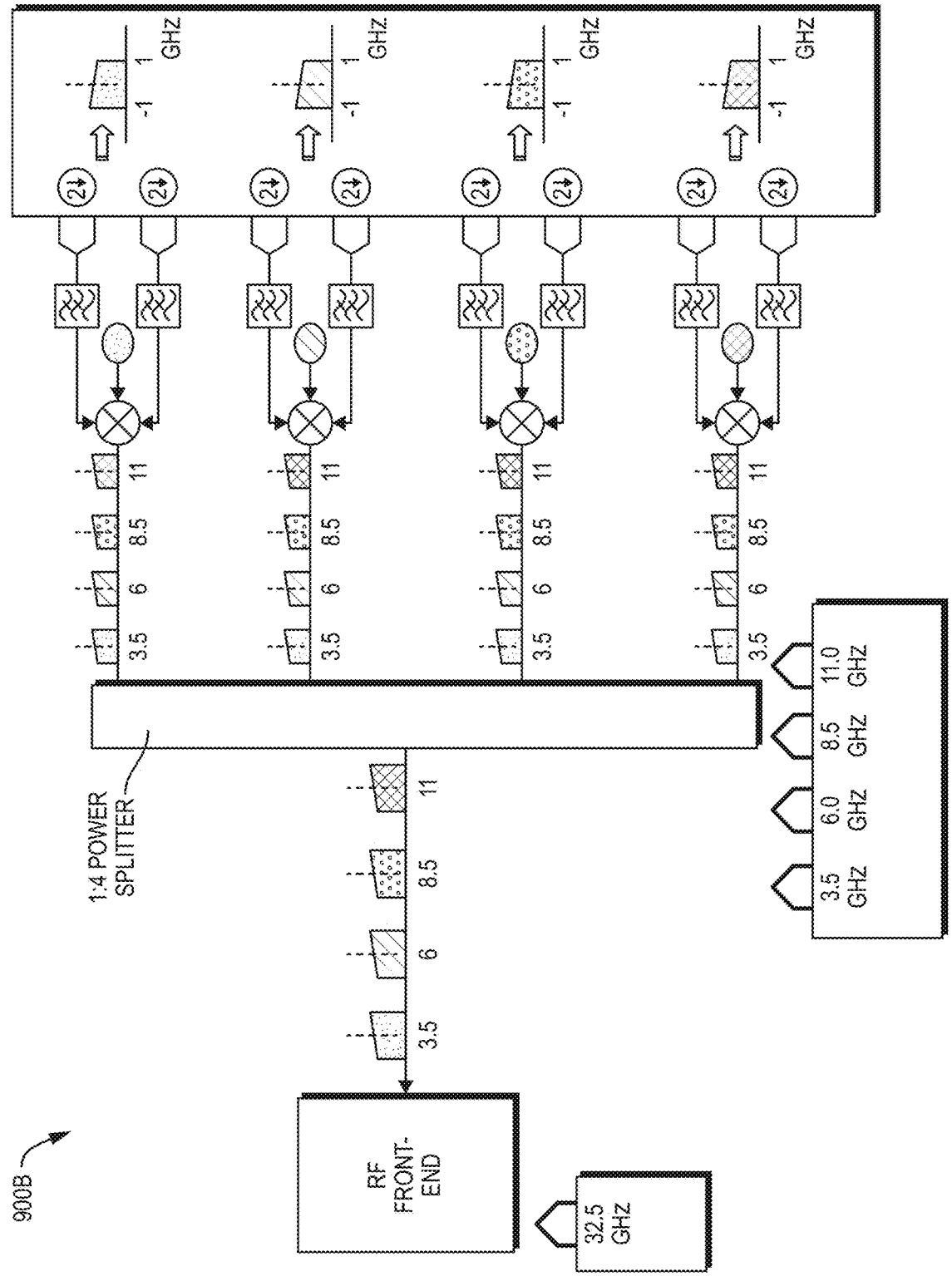

In order to address the challenges and impairments that were discussed in Sec. V-A, and at the same time maintain a low complexity and cost setup; an example embodiment of an experimental setup is shown in FIGS. 9A and 9B, where FIG. 9A is a block diagram of an example embodiment of a transmitter 900A and FIG. 9B is a block diagram of an example embodiment of a receiver 990B. The evaluation board used for this experiment was a Gen-1 ZU28DR from HTG (Hitech Global. Htg-zth3: Xilinx zynq ultrascale+ rfsoc development platform. [Online]. Available: http://www.hitechglobal.comBoards/Zynq_RFSoc.htm). To support the 8 GHz target bandwidth, all the data converters on the chip were utilized. In this experiment, a random data generator was utilized running in real-time in the PL while leaving the PCIe interface for application data for future work. Given that the random data generator gets initialized on boot-up, and without proper synchronization, it will be difficult to align the data sequence on the RX with the TX to calculate BER. With that in mind, IQ constellations and EVM were relied on to analyze performance. However, when using a fixed hard-coded payload for the same experimental setup it was noticed that BER for channels 1, 2, and 3 were almost 0%. After IQ up-conversion on the TX side and before down-conversion on the RX side, a low-pass filter was utilized for both channels 1 and 2. This low-pass filter has a cut-off frequency close to the highest frequency of that particular channel. This allows us to filter out any noise, and harmonics, outside the channel bandwidth that might interfere with the nearby channel. Ideally, a bandpass filter should perform better due to its capability to filter out on both ends outside the bandwidth of interest. However, given that such bandpass filters with 2 GHz of bandwidth at the frequencies of interest could not be found, low-pass filters were relied on for non-limiting example. Unlike, channels 1 and 2, filters for channels 3 and 4 could not be found. However, since channel 2 utilizes a filter, the impact of interference on channel 3 is minimal unlike channel 4.

C. Results

Figure 8A:
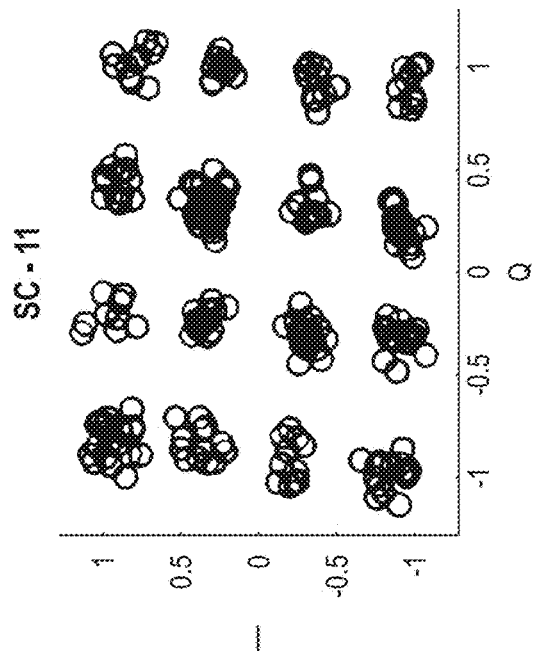
FIGS. 8A-D are plots of example embodiments of IQ constellations of four randomly picked sub-carriers for channel-1.
Figure 8B:
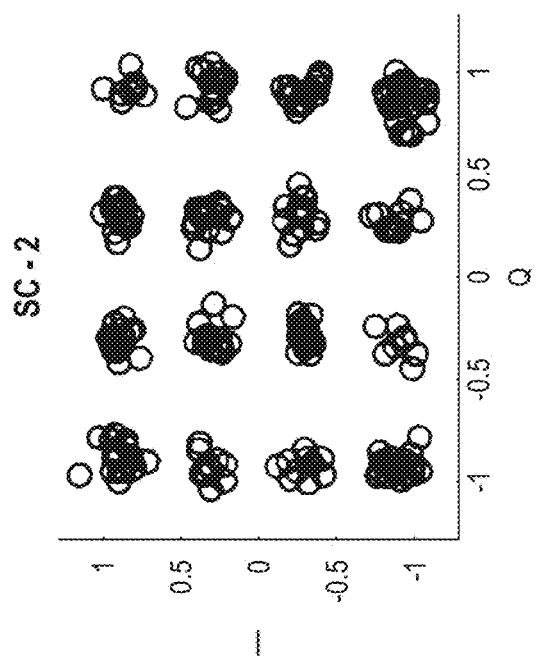
Figure 8C:
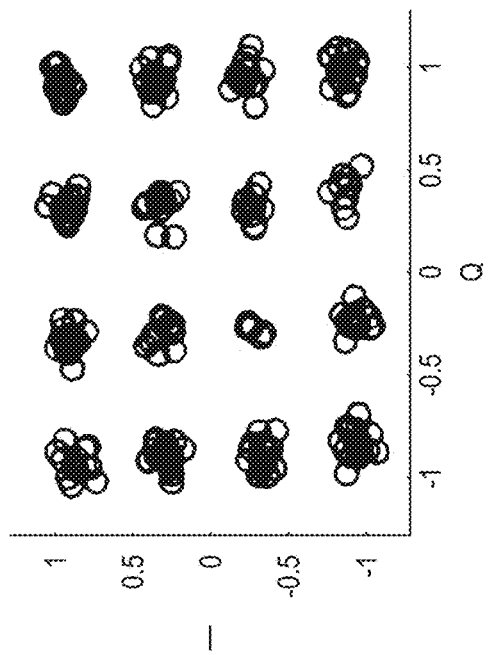
Figure 8D:
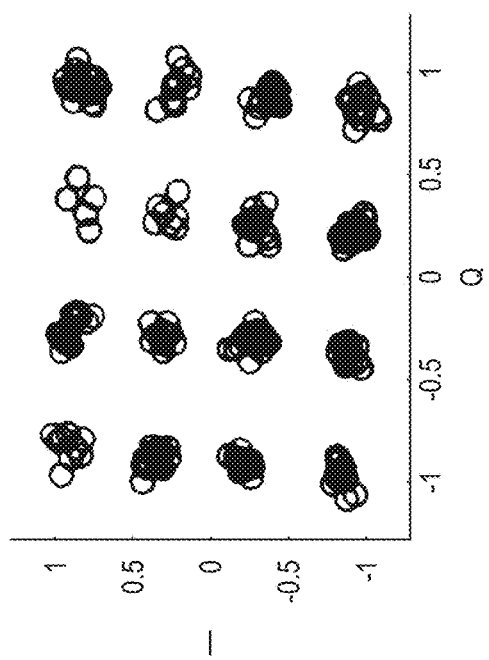
Figure 8E:
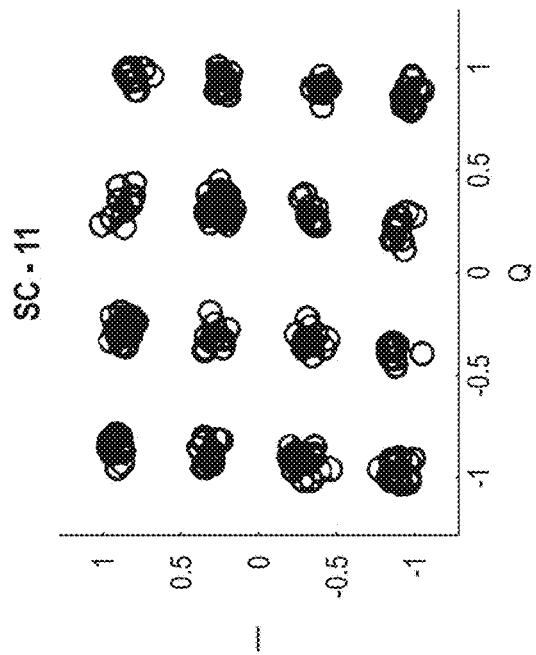
FIGS. 8E-H are plots of example embodiments of IQ constellations of four randomly picked sub-carriers for channel-2.
Figure 8F:
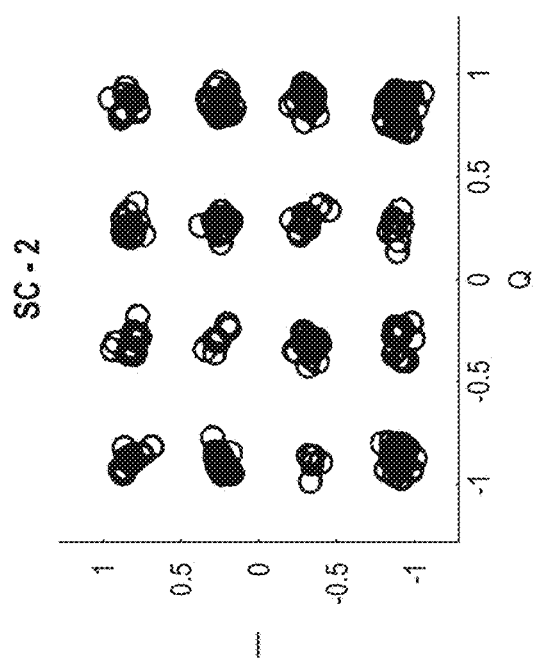
Figure 8G:
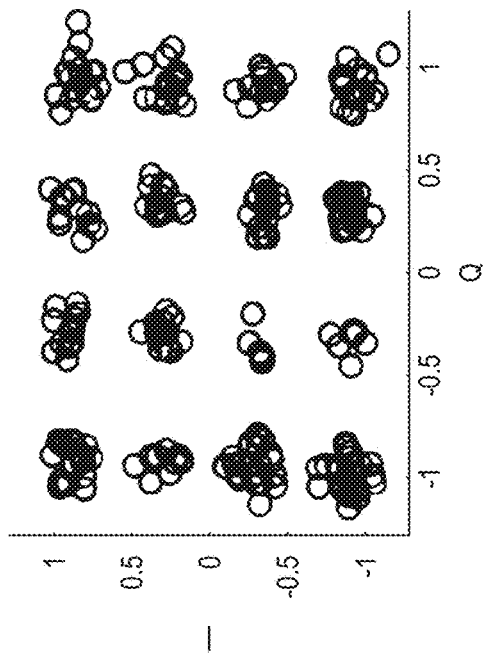
Figure 8H:
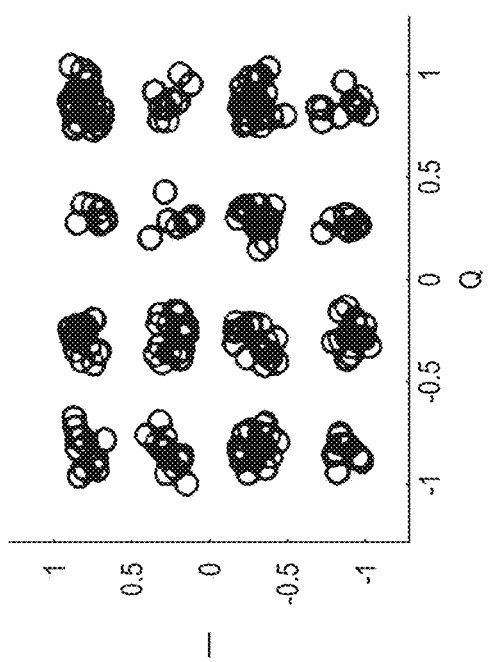
Figure 8I:
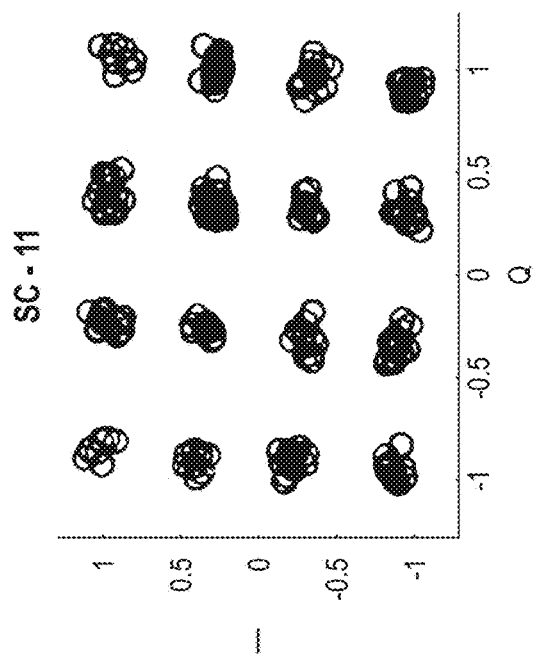
FIGS. 8I-L are plots of example embodiments of IQ constellations of four randomly picked sub-carriers for channel-3.
Figure 8J:
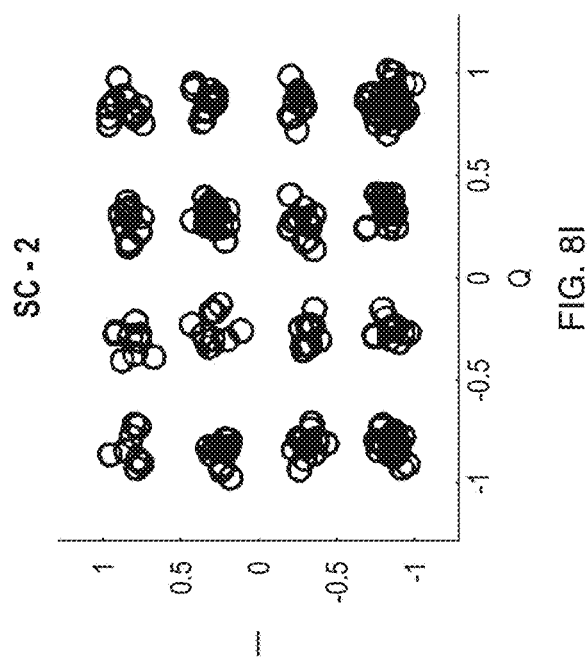
Figure 8K:
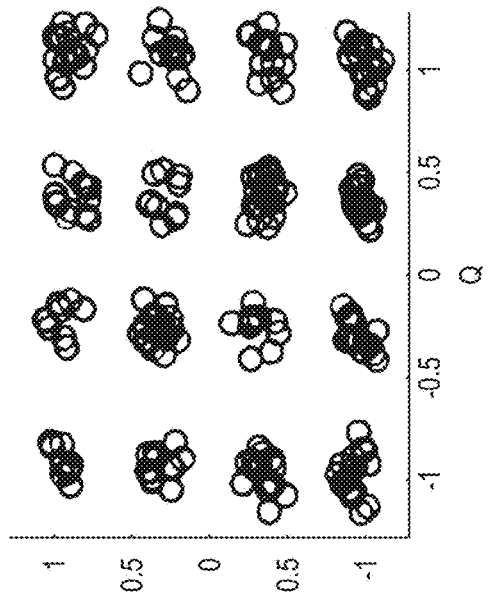
Figure 8L:
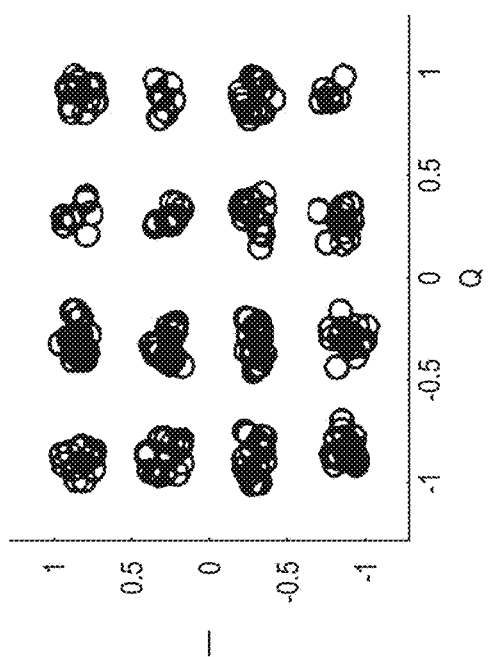
Figure 8M:
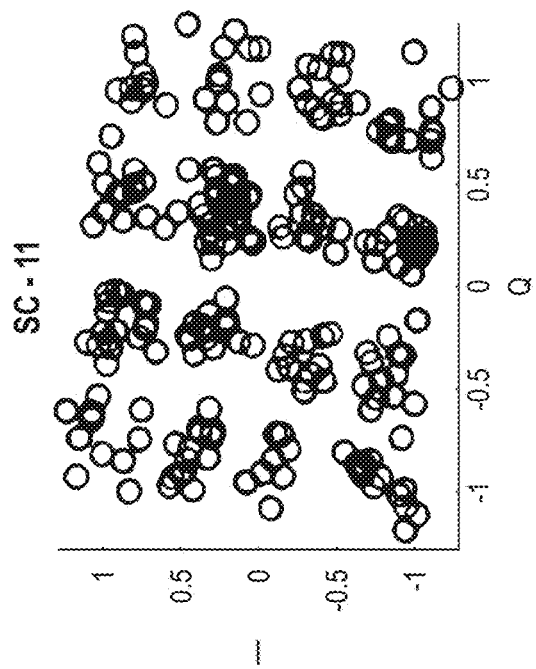
FIGS. 8M-P are plots of example embodiments of IQ constellations of four randomly picked sub-carriers for channel-4.
Figure 8N:
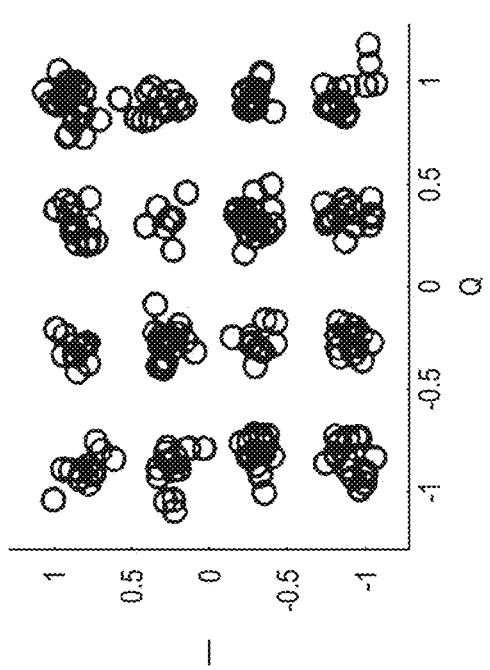
Figure 8O:
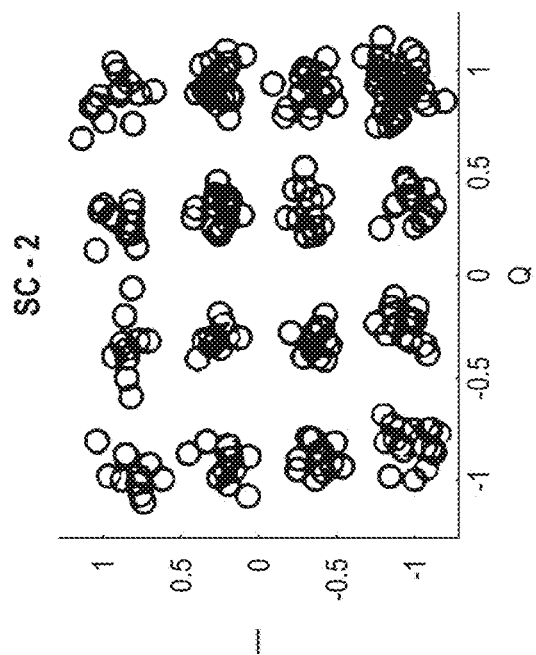
Figure 8P:
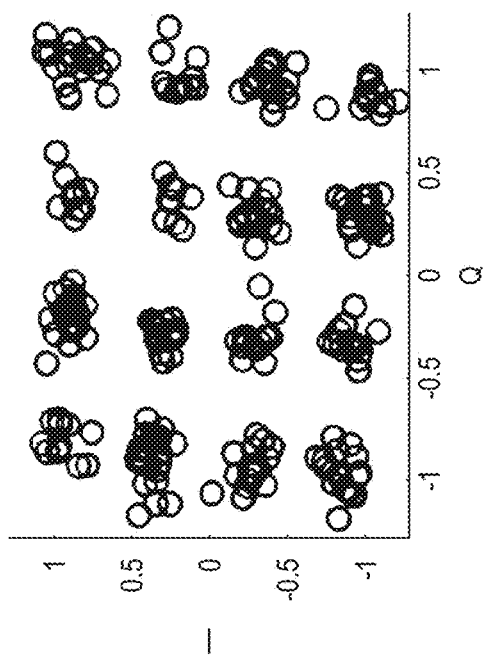

In FIGS. 7-1 through 7-52, the IQ constellation of Channel-1 for all 52 sub-carriers is illustrated. From the results of channel-1, it can be observed that this channel provides the best results in terms of EVM. This occurs due to the channel being on the lower end of the frequency band and given that the mixer experiences low leakages and imbalances at this low frequency. With that being said, with minor tweaking, it is understood that channel-1 can be refined in order to reach higher modulation orders such as 64 or even 128 QAM. In FIGS. 8A-D the IQ constellations of 4 randomly picked sub-carriers is illustrated for channel-1 (FIG. 8A), channel-2 (FIG. 8B), channel-3 (FIG. 8C), and channel-4 (FIG. 8D). FIGS. 8E-P show additional IQ constellations. Although the EVM begins to degrade from one channel to the next, it can be noticed that some sub-carriers exhibit much better EVM than others. With that in mind, given the huge bandwidth, it would be more efficient to conduct extensive measurements on each sub-carrier to allow for different modulation orders for different sub-carriers. In Table IV, the average EVM per channel is listed, alongside the bit and data rates. Given the bandwidth and setup, 32.8 Gbps bit-rates can be reached when only considering the bandwidth and modulation order. Unlike the bit rate, the data-rate accounts for meaningful data being transmitted. To calculate the data rate, one can take into account the packet time duration and the amount of data being sent within that packet. The nominal data rate achieved was ≈16 Gbps, which is roughly half the bit rate due to the CP length, header length, and the fact that only 52 out of the 64 sub-carriers were used for data.

TABLE IV

4-CHANNEL REAL-TIME CAPABILITY

| Channel Number | $EVM_{avg}$ | Bitrate [Gbps] | Data Rate [Gbps] |
|---|---|---|---|
| Channel 1 | 10.21% | 8.2 | 4 |
| Channel 2 | 11.24% | 8.2 | 4 |
| Channel 3 | 11.73% | 8.2 | 4 |
| Channel 4 | 14.99% | 8.2 | 4 |
| Total | | 32.8 | 16 |

VI. EXTENSION OF THE TEST-BED AND THE ROLE IN DYNAMIC EXPERIMENTATION ABOVE 100 GHZ FREQUENCIES

In addition to massive bandwidth requirements, tomorrow's networks will require key enabling technologies such as electronically steerable RF beams, in order to offset complexities in the propagation channel. The relatively high path loss present at mm-wave bands requires high aperture gains in order to meet the signal-to-noise and interference (SINR) ratio requirements for low-bit error rate transmission. The number of devices, nodes, and users demanding concurrent services from a network is also growing, requiring tomorrow's networks to support hundreds, if not thousands, of high-speed data connections at a time. Given that both the number of parallel connections and the data rate per connection are increasing exponentially, the ability to push all the data back and forth from an access point to the backbone network becomes a pressing challenge; this is especially true when the access point does not have access to a low bit error rate high capacity backbone network (i.e., fiber network). A back-haul is typically a fixed connection that connects a wireless access point to either a relay node, another access point, or to a switch. Typically, today's mobile networks make extensive use of the existing fiber network to accommodate back-haul considering highly built environments where such wired infrastructure is present. However, for low-density and rural areas where optical fiber penetration is low or otherwise not available, designers have to resort to wireless back-haul connections. In fact, for early cellular generations designed at times when fiber networks were not available, microwave point-to-point networks provided much of the back-haul connectivity between the base stations and the switch. In the context of 5G and 6G wireless systems, the demands on a back-haul network cannot be met by conventional microwave link-based approaches.

To understand why, one may consider a hypothetical access point in a future 6G network, where the access point maintains (say) 64 simultaneous connections to a multitude of wireless IoT devices, unmanned aerial systems (UAS), large intelligent surfaces (LIS) based relays, other access points, vehicles, robots or other systems. Let us assume each connection requires 1 GHz of bandwidth, which is a very conservative number considering the ambitious goals of tomorrow's networks. The aggregate bandwidth for the access point is 64 GHz! That is more than 10×the total available bandwidth at legacy bands, and even larger than the 60 GHz carrier frequency in the ISM band.

To put the problem into perspective, the 28 GHz mm-wave bands have a channel bandwidth of 800 MHz. But if there are N simultaneous connections, the aggregate bandwidth is 800 N which is far too large for practical wireless back-haul for even moderately large values of N. Of course, accommodation of such aggregate bandwidths is feasible when fiber networks are available. However, when no fiber back-haul is possible, one may return to the challenge of wireless back-haul despite the extremely large aggregate bandwidth of the access point. A proposed solution to address this problem includes moving the wireless back-haul to sub-THz bands where there is abundant bandwidth to accommodate the network capacity needs. For example, it may be possible to exploit several carrier frequencies in the 100-300 GHz range such that the total aggregate bandwidth is sufficient to push all of the data through without compromising capacity. A strategy was adopted where for total aggregate bandwidth $B_T$ the back-haul exploits M continuous bands having bandwidth $B_k$, at center frequency $F_k$, k=1, 2, ... M, to yield the total bandwidth requirements such that $B_T = \Sigma B_k$. For example, if $B_T$=64 GHz, and $F_1$=60 GHz, $F_2$=140 GHz, and $F_3$=240 GHz, and if $B_1$=10 GHz, $B_2$=22 GHz, and $B_3$=32 GHz, then one can design a multi-frequency back-haul link that operates at 60, 140, and 240 GHz, with channel bandwidths of 10, 22, and 32 GHz, to achieve the requirements of the access point.

The multiple on-chip DACs and ADCs available in RFSoCs will be used to multiplex multiple low-bandwidth slower channels to process multi-channel high bandwidth signals enabling ultra-wideband real-time links.

OFDM is considered for modulating each channel as finer control of each channel's bandwidth can be achieved by nulling out edge subcarriers. OFDM will also work well with the DL-based channel estimation and equalization depending on the dynamic weather and other link conditions.

With the increasing demands of internet traffic, and the need for ultra-high speed links to support current and future applications, moving towards the THz band becomes a must. With that being said, the development of such systems that are capable of utilizing these big portions of bandwidth is not a trivial task. In this disclose, an example embodiment builds from the ground up a unique solution that can efficiently and effectively handle multi-GHz of bandwidth at the sub-THz band. Given the success of this solution and its ability to reach high modulation orders, it is understood that this opens an exciting new door to utilize this solution as the foundation for upper networking layer solutions.

Figure 10A:
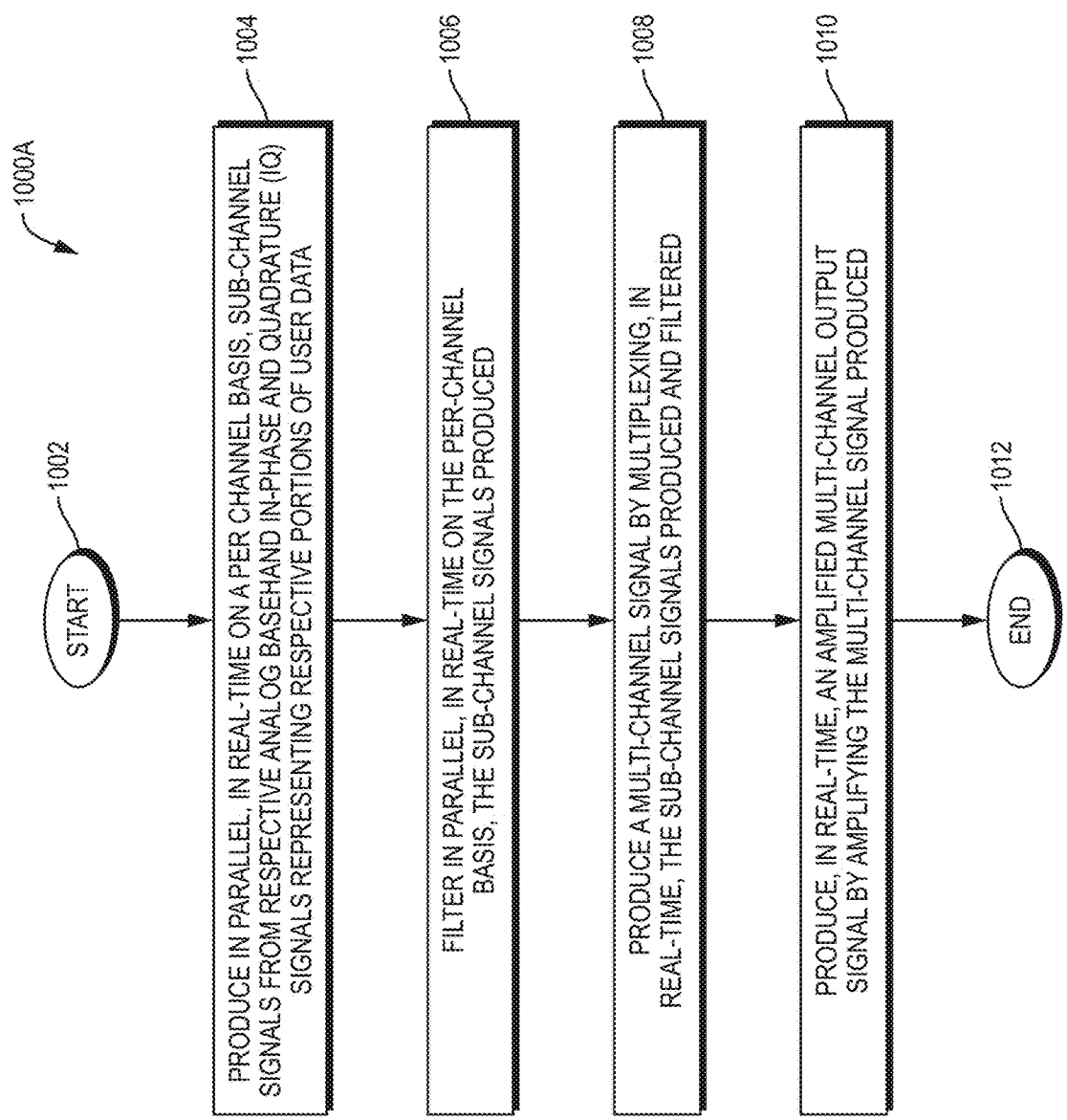
FIG. 10A is a flow diagram of an example embodiment of a method for real-time wireless communications.

FIG. 10A is a flow diagram 1000A of an example embodiment of a method for real-time wireless communications. The method begins (1002) and comprises producing in parallel, in real-time on a per channel basis, sub-channel signals from respective analog baseband in-phase and quadrature (IQ) signals representing respective portions of user data (1004). The method further comprises filtering in parallel, in real-time on the per-channel basis, the sub-channel signals produced (1006). The method further comprises producing a multi-channel signal by multiplexing, in real-time, the sub-channel signals produced and filtered (1008). The method further comprises producing, in real-time, an amplified multi-channel output signal by amplifying the multi-channel signal produced (1010). The amplified multi-channel output signal represents the user data in its entirety. The method thereafter ends (1012) in the example embodiment.

Figure 10B:
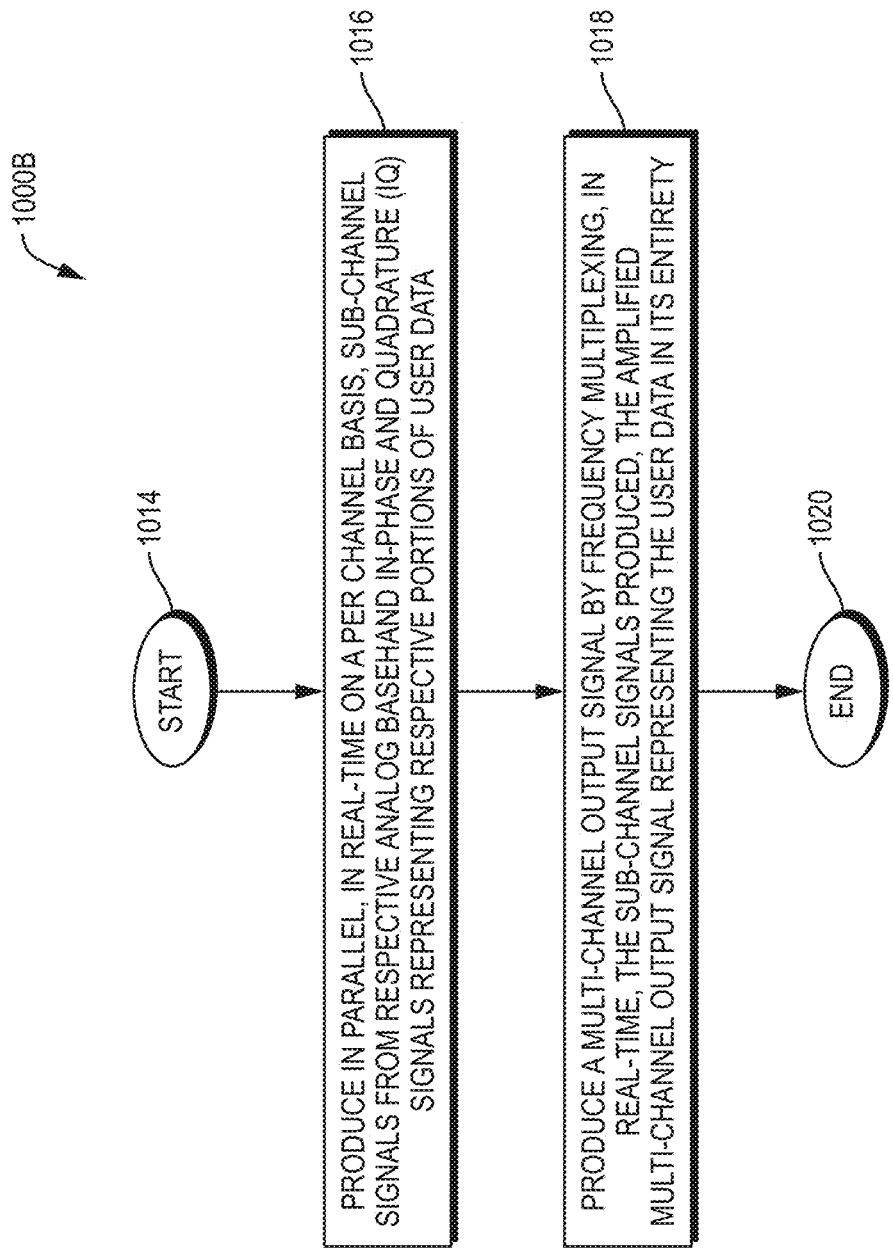
FIG. 10B is a flow diagram of an example embodiment of another method for real-time wireless communications.

FIG. 10B is a flow diagram 1000B of an example embodiment of a method for real-time wireless communications. The method begins (1014) and comprises producing in parallel, in real-time on a per channel basis, sub-channel signals from respective analog baseband in-phase and quadrature (IQ) signals representing respective portions of user data (1016). The method further comprises producing a multi-channel output signal by multiplexing, in real-time, the sub-channel signals produced, the multi-channel output signal representing the user data in its entirety (1018). The method thereafter ends (1020) in the example embodiment.

Figure 11:
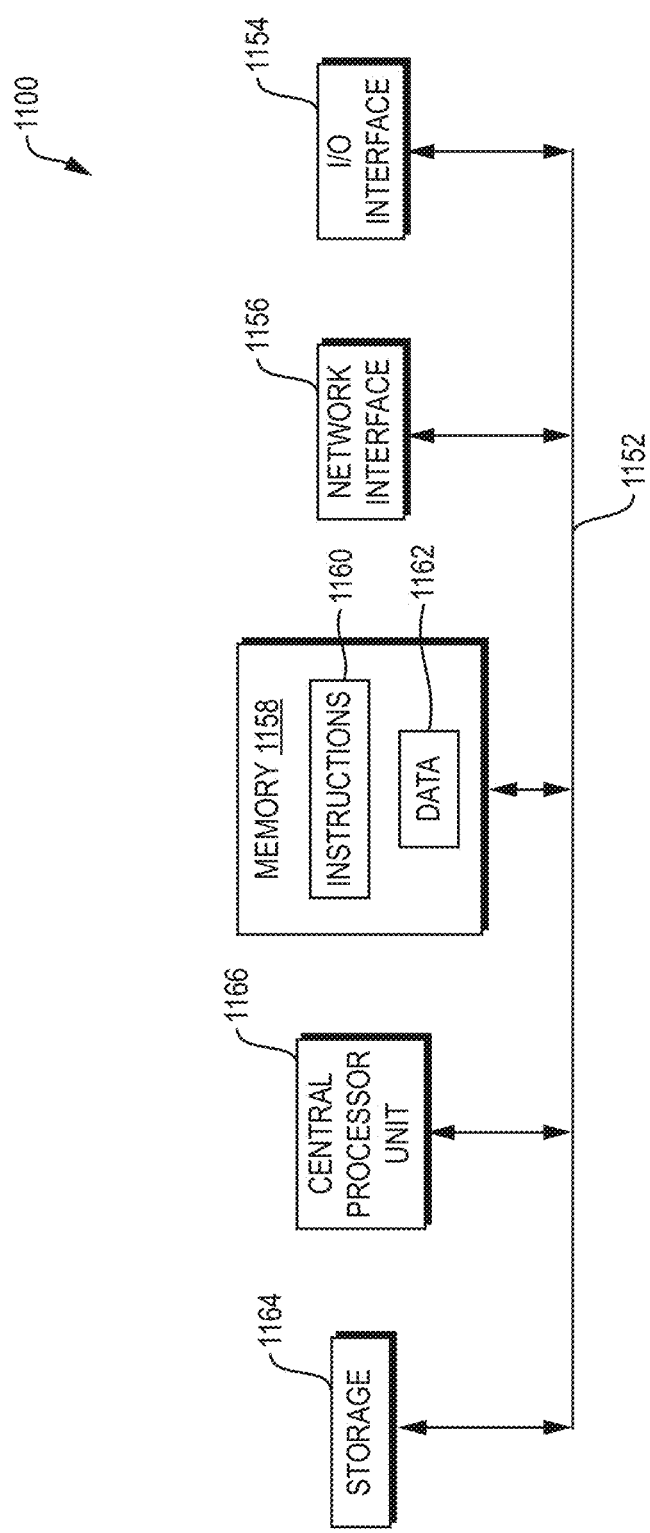

FIG. 11 is a block diagram of an example of the internal structure of a computer 1100 in which various embodiments of the present disclosure may be implemented. The computer 1100 contains a system bus 1152, where a bus is a set of hardware lines used for data transfer among the components of a computer or digital processing system. The system bus 1152 is essentially a shared conduit that connects different elements of a computer system (e.g., processor, disk storage, memory, input/output ports, network ports, etc.) that enables the transfer of information between the elements. Coupled to the system bus 1152 is an I/O device interface 1154 for connecting various input and output devices (e.g., keyboard, mouse, displays, printers, speakers, etc.) to the computer 1100. A network interface 1156 allows the computer 1100 to connect to various other devices attached to a network (e.g., global computer network, wide area network, local area network, etc.). Memory 1158 provides volatile or non-volatile storage for computer software instructions 1160 and data 1162 that may be used to implement embodiments of the present disclosure, where the volatile and non-volatile memories are examples of non-transitory media. Disk storage 1164 provides non-volatile storage for computer software instructions 1160 and data 1162 that may be used to implement embodiments of the present disclosure. A central processor unit 1166 is also coupled to the system bus 1152 and provides for the execution of computer instructions.

An example embodiment disclosed herein may employ hardware, software, firmware, electronic control component, processing logic, and/or processor device, individually or in any combination, including without limitation: an application specific integrated circuit (ASIC), a field-programmable gate-array (FPGA), an electronic circuit, a processor and memory that executes one or more software or firmware programs, and/or other suitable components that provide the described functionality.

Example embodiments disclosed herein may be configured using a computer program product; for example, controls may be programmed in software for implementing example embodiments. Further example embodiments may include a non-transitory computer-readable medium that contains instructions that may be executed by a processor, and, when loaded and executed, cause the processor to complete methods described herein. It should be understood that elements of the block and flow diagrams may be implemented in software or hardware, such as via one or more arrangements of circuitry of FIG. 11, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read-only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for real-time wireless communications, the system comprising:
   a plurality of in-phase and quadrature (IQ) mixers configured to produce in real-time on a per-channel basis, sub-channel signals from respective analog baseband IQ signals representing respective portions of user data; and
   a power combiner configured to produce a multi-channel output signal by frequency multiplexing, in real-time, the sub-channel signals produced, the multi-channel output signal representing the user data in its entirety.

2. The system of claim 1, further comprising an output amplifier coupled to the power combiner, the output amplifier configured to amplify, in real-time, the multi-channel output signal produced by the power combiner and wherein the output amplifier is further configured to cover a frequency range of the sub-channel signals produced.

3. The system of claim 1, further comprising sub-channel amplifiers configured to amplify in parallel, in real-time on the per-channel basis, the sub-channel signals produced.

4. The system of claim 1, further comprising filters coupled to respective IQ mixers of the plurality of IQ mixers, the filters configured to filter in parallel, in real-time on the per-channel basis, the sub-channel signals produced.

5. The system of claim 1, wherein the system further comprises:
a plurality of digital-to-analog converter (DAC) pairs; and
a plurality of pre-mixer filter pairs, wherein a sub-channel of a plurality of channels of the system includes a respective DAC pair of the plurality of DAC pairs, a respective pre-mixer filter pair of the plurality of pre-mixer filter pairs, a respective IQ mixer of the plurality of IQ mixers, and a respective post-mixer filter interposed between the respective IQ mixer and the power combiner.

6. The system of claim 5, wherein the respective DAC pair is configured to produce a respective I stream and a respective Q stream from a respective digital packetized portion of the user data, wherein the respective pre-mixer filter pair is configured to filter the respective I stream and respective Q stream produced, wherein the respective IQ mixer is configured to produce a respective sub-channel signal of the sub-channel signals based on the respective I stream and respective Q stream produced and filtered, and wherein the multi-channel output signal produced includes the respective sub-channel signal produced.

7. The system of claim 1, wherein the system is coupled to a radio frequency (RF) front-end and wherein the system is configured to output, via the RF front-end, the multi-channel output signal produced.

8. The system of claim 7, wherein the plurality of IQ mixers is a plurality of transmit stage IQ mixers and wherein the system further comprises:
a power splitter configured to split an input signal, received via the RF front-end, into a plurality of copies of the input signal, wherein a total number of the plurality of copies is based on a total number of channels of the system;
a plurality of receive stage IQ mixers coupled to the power splitter, receive stage IQ mixers of the plurality of receive stage IQ mixers configured to produce, in real-time, a respective I stream signal and respective Q stream signal, in parallel on a per-channel basis, based on a respective copy of the input signal of the plurality of copies of the input signal;
a plurality of receive stage filters coupled to respective receive stage IQ mixers of the plurality of receive stage IQ mixers, wherein receive stage filters of the plurality of receive stage filters are configured to filter in parallel, in real-time on the per-channel basis, the respective I stream and respective Q stream signals produced; and
a plurality of receive stage amplifiers coupled to respective receive stage filters of the plurality of receive stage filters, wherein receive stage filters of the plurality of receive stage filters are configured to amplify in parallel, in real-time on the per-channel basis, the respective I stream and respective Q stream signals produced and filtered.

9. The system of claim 8, further comprising a plurality of analog-to-digital converters (ADCs), wherein ADCs of the plurality of ADCs are configured to produce in parallel, in real-time, a plurality of digital data streams by converting in parallel, in real-time on the per channel basis, the respective I stream and respective Q stream signals produced, filtered, and amplified, from an analog domain to a digital domain.

10. The system of claim 1, wherein the system is configured to operate in a terahertz (THz) frequency band and utilize a target bandwidth in real-time.

11. The system of claim 1, wherein the multi-channel output signal produced is a real-time, ultra-broadband THz wireless signal and wherein the real-time, ultra-broadband THz wireless signal is a real-time, multi-GHz wireless signal.

12. The system of claim 1, wherein the system is implemented via an integrated circuit (IC), the IC including analog, digital, mixed signal and photonic integrated circuits (ICs).

13. The system of claim 1, further comprising a plurality of data converters and wherein the user data is processed through a digital system on a RF system-on-chip (RFSoC) in a polyphase architecture to match a sampling rate of the data converters of the plurality of data converters.

14. A method for real-time wireless communications, the method comprising:
producing in parallel, in real-time on a per channel basis, sub-channel signals from respective analog baseband in-phase and quadrature (IQ) signals representing respective portions of user data; and
producing a multi-channel output signal by frequency multiplexing, in real-time, the sub-channel signals produced, the multi-channel output signal representing the user data in its entirety.

15. The method of claim 14, further comprising amplifying the multi-channel output signal and wherein the amplifying includes covering a frequency range of all sub-channels of the sub-channels produced.

16. The method of claim 14, further comprising amplifying in parallel, in real-time on the per-channel basis, the sub-channel signals produced.

17. The method of claim 14, further comprising filtering in parallel, in real-time on the per-channel basis, the sub-channel signals produced.

18. The method of claim 14, further comprising:
producing a respective I stream and a respective Q stream from a respective digital packetized portion of the user data;
mixing the respective I stream and respective Q stream produced, wherein the mixing includes producing a respective sub-channel signal of the sub-channel signals based on the respective I stream and respective Q stream produced and filtered, and wherein the multi-channel output signal produced includes the respective sub-channel signal produced.

19. The method of claim 14, further comprising outputting, via a radio frequency (RF) front-end, the multi-channel output signal produced.

20. The method of claim 19, further comprising:
splitting an input signal, received via the RF front-end, into a plurality of copies of the input signal, wherein a total number of the plurality of copies is based on a total number of channels of a system;
producing, in real-time, a respective I stream signal and respective Q stream signal, in parallel on a per-channel basis, based on a respective copy of the input signal of the plurality of copies of the input signal;
filtering in parallel, in real-time on the per-channel basis, the respective I stream and respective Q stream signals produced; and amplifying in parallel, in real-time on the per-channel basis, the respective I stream and respective Q stream signals produced and filtered.

21. The method of claim 20, further comprising:
producing in parallel, in real-time, a plurality of digital data streams by converting in parallel, in real-time on the per channel basis, the respective I stream and respective Q stream signals produced, filtered, and amplified, from an analog domain to a digital domain.

22. The method of claim 21, further comprising operating in a terahertz (THz) frequency band and utilizing a target bandwidth in real-time.

23. The method of claim 14, wherein the multi-channel output signal produced is a real-time, ultra-broadband THz wireless signal and wherein the real-time, ultra-broadband THz wireless signal is a real-time, multi-GHz wireless signal.

24. The method of claim 14, further comprising performing the method via an integrated circuit (IC), the IC including analog, digital, mixed signal and photonic integrated circuits (ICs).

* * * * *